(12) United States Patent
Naegle et al.

(10) Patent No.: US 10,303,697 B1
(45) Date of Patent: May 28, 2019

(54) TEMPORAL DATA SYSTEM

(71) Applicants: National Technology & Engineering Solutions of Sandia, LLC, Albuquerque, NM (US); Lewis Rhodes Labs, Inc., Concord, MA (US)

(72) Inventors: John H. Naegle, Albuquerque, NM (US); James Bradley Aimone, Albuquerque, NM (US); Frances S. Chance, Albuquerque, NM (US); Craig Michael Vineyard, Albuquerque, NM (US); David R. Follett, Boxborough, MA (US); Pamela L. Follett, Boxborough, MA (US)

(73) Assignees: National Technology & Engineering Solutions of Sandia, LLC, Albuquerque, NM (US); Lewis Rhodes Labs, Inc., Concord, MA (US)

( * ) Notice: Subject to any disclaimer, the term of this patent is extended or adjusted under 35 U.S.C. 154(b) by 329 days.

(21) Appl. No.: 14/749,890

(22) Filed: Jun. 25, 2015

(51) Int. Cl.
*G06N 5/04* (2006.01)
*G06F 16/84* (2019.01)
*G06F 16/25* (2019.01)
*G06N 7/00* (2006.01)

(52) U.S. Cl.
CPC .......... *G06F 16/254* (2019.01); *G06F 16/258* (2019.01); *G06F 16/86* (2019.01); *G06N 5/04* (2013.01); *G06N 7/005* (2013.01)

(58) Field of Classification Search
CPC ......... G06F 17/30598; G06F 17/30563; G06F 17/30551; G06F 17/30309; G06F 17/30424; G06F 17/30241; G06F 17/30539; G06F 17/30569; G06F 17/30917; G06F 17/30386; G06F 17/30595; G06F 16/254; G06F 16/86; G06F 16/258; G06N 5/048; G06N 5/04; G06N 7/005; G06N 99/005; G06N 5/005
USPC .................................................. 707/752, 644
See application file for complete search history.

(56) References Cited

U.S. PATENT DOCUMENTS 6,493,637 B1 * 12/2002 Steeg .................. G06F 17/2715
  702/19
6,542,966 B1 * 4/2003 Crawford .............. G06F 12/126
  711/133
6,681,295 B1 * 1/2004 Root .................... G06F 9/30047
  711/128

(Continued)

OTHER PUBLICATIONS

Jaypalsinh A. Gohil et al., Aug. 2015, International Journal of Database Management Systems, vol. 7, No. 4, pp. 11-22.*

(Continued)

*Primary Examiner* — Jay A Morrison
*Assistant Examiner* — Antonio J Caiado
(74) *Attorney, Agent, or Firm* — Yee & Associates, P.C.

(57) ABSTRACT

A method for processing data is provided. Data is identified by a computer system. The data is processed in parallel by the computer system using temporal transformations to form pieces of temporal data. The pieces of temporal data are placed by the computer system in an order as the pieces of temporal data are generated by the temporal transformations to form a sequence of temporal data. The order of the sequence is based on a priority of when the pieces of temporal data should be processed, enabling performing an action.

25 Claims, 18 Drawing Sheets

(56) References Cited

U.S. PATENT DOCUMENTS

| | | | | |
|---|---|---|---|---|
| 8,452,855 B2* | 5/2013 | Higgins | | H04W 4/02 455/3.04 |
| 8,577,892 B2* | 11/2013 | Pairault | | G06F 17/3087 707/740 |
| 8,868,493 B2* | 10/2014 | Serlet | | G06F 17/30174 707/610 |
| 9,015,093 B1* | 4/2015 | Commons | | G01C 21/3602 701/23 |
| 9,026,490 B2* | 5/2015 | Holt | | G06F 17/30578 707/610 |
| 2001/0041015 A1* | 11/2001 | Chui | | G06F 17/148 382/240 |
| 2004/0133927 A1* | 7/2004 | Sternberg | | G06F 17/30247 725/136 |
| 2005/0129311 A1* | 6/2005 | Haynes | | G06K 9/00248 382/170 |
| 2005/0177593 A1* | 8/2005 | Solomon | | G06N 5/043 |
| 2008/0059389 A1* | 3/2008 | Jaros | | G06N 3/04 706/12 |
| 2008/0263012 A1* | 10/2008 | Jones | | G06F 17/30811 |
| 2009/0150311 A1* | 6/2009 | George | | G06N 3/049 706/12 |
| 2009/0150507 A1* | 6/2009 | Davis | | H04L 51/14 709/207 |
| 2009/0299987 A1* | 12/2009 | Willson | | G06F 16/254 |
| 2010/0223276 A1* | 9/2010 | Al-Shameri | | G06F 17/30333 707/769 |
| 2010/0306249 A1* | 12/2010 | Hill | | G06F 17/30867 707/769 |
| 2012/0014457 A1* | 1/2012 | He | | H04N 19/13 375/240.25 |
| 2012/0045095 A1* | 2/2012 | Tate | | G06T 5/003 382/103 |
| 2012/0203925 A1* | 8/2012 | Curcio | | H04L 67/12 709/235 |
| 2013/0018849 A1* | 1/2013 | Johnston | | G06F 17/30309 707/687 |
| 2013/0080641 A1* | 3/2013 | Lui | | H04L 67/10 709/226 |
| 2013/0318053 A1* | 11/2013 | Provenzano | | G06F 17/30162 707/692 |
| 2013/0339371 A1* | 12/2013 | Hayashi | | G06F 17/3087 707/743 |
| 2014/0114896 A1* | 4/2014 | Hawkins | | G06N 3/049 706/46 |
| 2014/0226855 A1* | 8/2014 | Savvides | | G06K 9/00771 382/103 |
| 2014/0279795 A1* | 9/2014 | Shibuya | | G05B 23/0254 706/46 |
| 2014/0297012 A1* | 10/2014 | Kobayashi | | G06T 13/205 700/94 |
| 2015/0039254 A1* | 2/2015 | Hidai | | G01R 19/2516 702/60 |
| 2015/0134589 A1* | 5/2015 | Marrelli | | G06F 17/30569 707/602 |
| 2015/0169714 A1* | 6/2015 | Imai | | G06F 17/30563 707/602 |
| 2015/0302113 A1* | 10/2015 | Rosenberg | | G06F 17/30554 707/722 |
| 2017/0063904 A1* | 3/2017 | Muddu | | H04L 63/1425 |
| 2018/0120131 A1* | 5/2018 | Noda | | G06Q 10/06 |

OTHER PUBLICATIONS

Jiawei Han, Jian Pei, Micheline Kamber, 2006, Morgan Kaufmann Publishers, Second Edition, pp. 467-534.*

Dusan Petkovic, May 2015, Modern Temporal Data Models: Strengths and Weaknesses, Communications in Computer and Information Science, 2015 comference paper, entire publication.*

Shireen Y. Elhabian et al. 2008, Recent Patents on Computer Science, Edition 2008, pp. 32-54.*

* cited by examiner

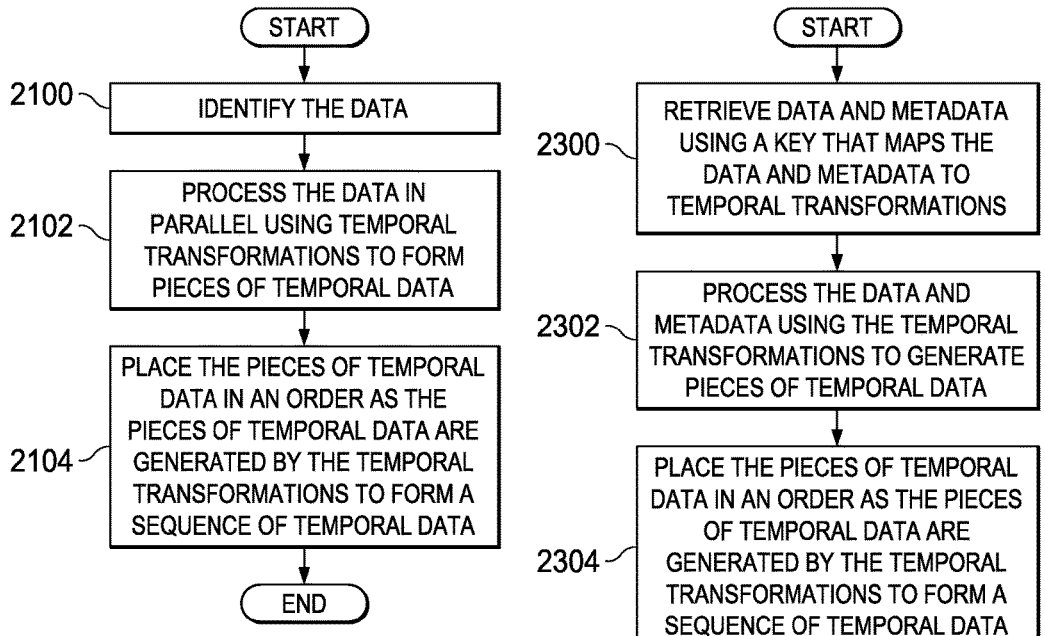
FIG. 21
FIG. 23
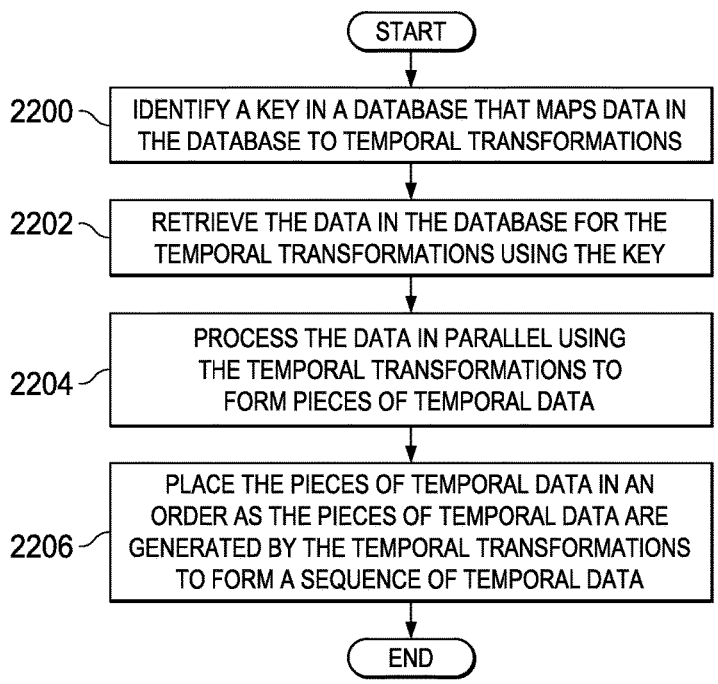
FIG. 22

TEMPORAL DATA SYSTEM

GOVERNMENT LICENSE RIGHTS

This invention was made with United States Government support under Contract No. DE-AC04-94AL85000 between Sandia Corporation and the United States Department of Energy. The United States Government has certain rights in this invention.

BACKGROUND INFORMATION

1. Field

The present disclosure relates generally to an improved computer system, and in particular, to a method and apparatus for processing data. Still more particularly, the present disclosure relates to a method and apparatus for transforming the data into temporal data.

2. Background

Data processed by computer systems are often stored in databases. Databases may take different forms. For example, a database may be a hierarchical database, a relational database, or some other type of database.

The database allows for storing, organizing, modifying, deleting, or otherwise accessing these values. The data in these databases are typically organized in a manner that supports processes that use the data.

Finding and retrieving data from a database may require more processing, resources, and time than desired. For example, using a database for real-time processing of images may require more processing power than desired. Increasing the processing power of the hardware may result in a desired level of processing for the images. However, in some cases, cost or technology may make this solution untenable.

Another solution may involve using image processing techniques that may reduce the amount of processing power. These techniques, however, may result in less than desired accuracy in processing images.

Therefore, it would be desirable to have a method and apparatus that take into account at least some of the issues discussed above, as well as other possible issues. For example, it would be desirable to have a method and apparatus that overcome technical problems with processing data as quickly as desired without the amount of processing resources needed with currently used techniques to access data in a database.

SUMMARY

An embodiment of the present disclosure provides a method for processing data. Data is identified by a computer system. The data is processed in parallel by the computer system using temporal transformations to form pieces of temporal data. The pieces of temporal data are placed by the computer system in an order as the pieces of temporal data are generated by the temporal transformations to form a sequence of temporal data. The order of the sequence is based on a priority of when the pieces of temporal data should be processed, enabling performing an action.

Another embodiment of the present disclosure provides a method for processing data. A key in a database that maps data in the database to temporal transformations is identified. The temporal transformations form pieces of temporal data from the data. The data for the temporal transformations is retrieved using the key. The data is processed in parallel using the temporal transformations to form the pieces of temporal data. The pieces of temporal data are placed in an order as the pieces of temporal data are generated by the temporal transformations to form a sequence of temporal data, enabling performing an action.

Yet another embodiment of the present disclosure provides a computer system comprising an information processor. The information processor identifies data; processes the data in parallel using temporal transformations to form pieces of temporal data; and places the pieces of temporal data in an order as the pieces of temporal data are generated by the temporal transformations to form a sequence of temporal data. The order of the sequence of temporal data is based on a priority of when the pieces of temporal data should be processed, enabling performing an action.

Still another embodiment of the present disclosure provides a computer program product for processing data comprising a computer readable storage media, first program code, second program code, and third program code. The first program code, stored on the computer readable storage media, identifies the data. The second program code, stored on the computer readable storage media, processes the data in parallel using temporal transformations to form pieces of temporal data. The third program code, stored on the computer readable storage media, places the pieces of temporal data in an order as the pieces of temporal data are generated by the temporal transformations to form a sequence of temporal data. The order of the sequence of temporal data is based on a priority of when the pieces of temporal data should be processed, enabling performing an action.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 21 is an illustration of a flowchart of a process for processing data in accordance with an illustrative embodiment;

FIG. 22 is another illustration of a flowchart of a process for processing data in accordance with an illustrative embodiment;

FIG. 23 is yet another illustration of a flowchart of a process for processing data in accordance with an illustrative embodiment.

DETAILED DESCRIPTION

Figure 1:
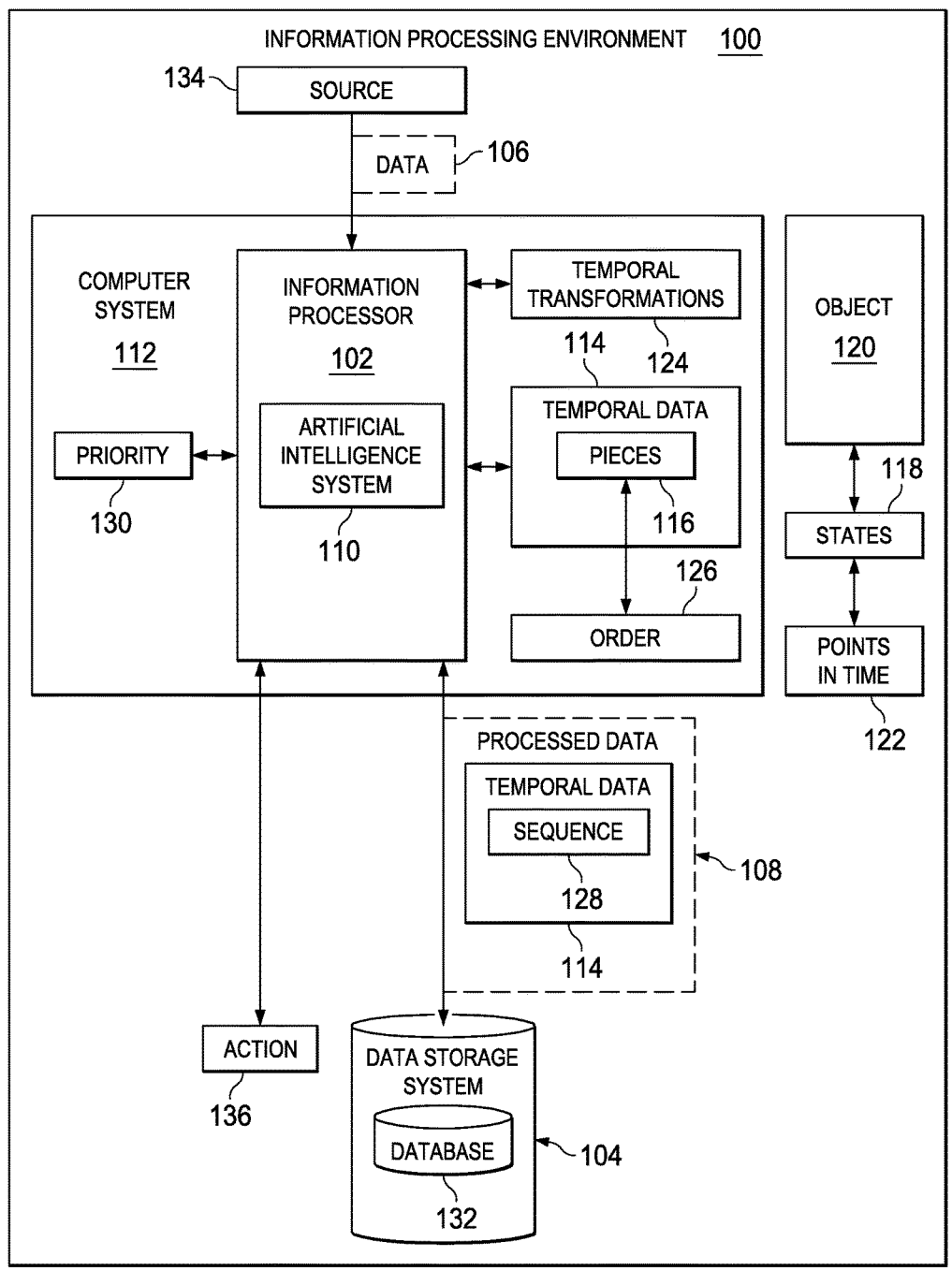
FIG. 1 is an illustration of a block diagram of an information processing environment in accordance with an illustrative embodiment.

The illustrative embodiments recognize and take into account one or more different considerations. For example, the illustrative embodiments recognize and take into account that different applications may use the state of an object that may change over time. For example, image processing and artificial intelligence systems use data that describe the state of an object over time.

The illustrative embodiments recognize and take into account that the information used in these models typically includes the state of objects for a particular type of environment. For example, the model may include a relationship between a state of an object and an action that should be taken on the object.

The illustrative embodiments recognize and take into account that the data representing the state of an object at different times may be stored in a database. The data representing the state of the object and the relation of this state to other possible states of the object are stored in the database. For example, a probability of a state to transition from one state to another state may be stored in the database. Feedback is a technique that may be used to identify relationships between states. For example, feedback can be used to identify a probability of a sequence of states of an object over time.

The illustrative embodiments recognize and take into account that storing and accessing the state of an object in a relational database may use more processing resources, more time, more power, more weight, and more volume than desired when accessing the data.

The illustrative embodiments recognize and take into account that more than one process may access the information about the state of an object in a database at the same time. Synchronization is a process that ensures that changes made to the state of the object by one process do not cause a problem with changes made by another process. Without synchronization, a first change to the state of the object made by a first process might be overwritten by a second change to the state of the object. Synchronizing parallel accesses to information about the state of an object in a database may use more processing resources, more time, or both more time and processing resources than desired.

The illustrative embodiments recognize and take into account that synchronization may occur using locks that protect access to the information about the state of the object. With locks, only one process can own the lock at a time. The process that owns the lock is the only process that is allowed to access the information about the state of the object.

The illustrative embodiments further recognize and take into account that synchronization can be achieved by assigning ownership of the information about the state of the object to a process. That process controls access to the state of the object and may process requests from other processes to access the information about the state of the object. The illustrative embodiments further recognize and take into account that these mechanisms for synchronization may take more processing resources and may be more complex than desired.

Thus, the illustrative embodiments recognize and take into account that it would be desirable to have a mechanism to store state data in a data structure in which the data is identified based on relationships of time, space, or a combination of time and space between states rather than currently used indices in currently available databases. The illustrative embodiments recognize and take into account that the amount of time needed to obtain and process data may be reduced.

The illustrative embodiments provide a method and apparatus for processing data. In one illustrative example, a method identifies data. The data is processed in parallel using temporal transformations. The temporal transformations form pieces of temporal data that represent the state of an object at points in time. The pieces of temporal data are placed in an order as the pieces of temporal data are generated by the temporal transformation to form a sequence of temporal data. The order of the pieces of temporal data is based on a priority of when the pieces of temporal data should be processed.

In the illustrative examples, a piece of data, such as a piece of temporal data, is a portion or part of the data. Each piece of data may be the same size or a different size as compared to another piece of data depending on the particular implementation. The piece of data may be based on a rule, such as each piece being a particular size. The piece of data may be based on a logical division of the data. For example, the piece of data may be the data that represent a value.

With reference now to the figures, and in particular, with reference to FIG. 1, an illustration of a block diagram of an information processing environment is depicted in accordance with an illustrative embodiment. Information processing environment 100 includes information processor 102 and data storage system 104.

In this illustrative example, information processor 102 processes data 106 to form processed data 108. For example, data 106 may be an input stream.

Information processor 102 may also store processed data 108 in data storage system 104. Information processor 102 may also access processed data 108 in data storage system 104. The accessing of processed data 108 by information processor 102 may include at least one of writing, reading, modifying, or otherwise accessing processed data 108. For example, processed data 108 may be at least one of an input stream or an output stream.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Information processor 102 may be implemented in software, hardware, firmware or a combination thereof. When software is used, the operations performed by information processor 102 may be implemented in program code configured to run on hardware, such as a processor unit. When firmware is used, the operations performed by information processor 102 may be implemented in program code and data and stored in persistent memory to run on a processor unit. When hardware is employed, the hardware may include circuits that operate to perform the operations in information processor 102.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In the illustrative example, information processor 102 may be artificial intelligence system 110. As depicted, artificial intelligence system 110 may include processes that model or are similar to human thought processes for processing data 106 and accessing processed data 108. As depicted, information processor 102 may be implemented in computer system 112.

As depicted, information processor 102 may also be implemented in data storage system 104. For example, information processor 102 may be implemented in database 132 in data storage system 104.

Computer system 112 is a hardware system that includes one or more data processing systems. When more than one data processing system is present, those data processing systems may be in communication with each other using a communications medium. The communications medium may be a network. The data processing systems may be selected from at least one of a computer, a server computer, a tablet, or some other suitable data processing system.

In operation, information processor 102 processes data 106 to form processed data 108 in the form of temporal data 114. As depicted, pieces 116 of temporal data 114 represent states 118 of object 120 at points in time 122. In this illustrative example, pieces 116 of temporal data 114 are all of the same size.

In the illustrative example, a state in states 118 may have a relationship with other states in states 118. These relationships are selected from at least one of space, time, space and time, or other suitable types of relationships between states.

In operation, information processor 102 processes data 106. For example, information processor 102 identifies data 106 that is to be processed. Information processor 102 processes data 106 using temporal transformations 124 to form pieces 116 of temporal data 114. Information processor 102 processes data 106 at least one of in parallel or serially.

In this illustrative example, information processor 102 identifies at least one of all of data 106 or a piece of data 106 for processing by a temporal transformation in temporal transformations 124. As depicted, information processor 102 may process data 106 in parallel using temporal transformations 124. For example, a copy of data 106 may be sent to each of temporal transformations 124 and processed at the same time by temporal transformations 124. In this manner, each of temporal transformations 124 processes one of the copies of data 106.

Information processor 102 may process pieces of data 106 serially using temporal transformations 124. Processing pieces of data 106 serially involves processing a first piece of data 106 before processing a second piece of data 106. For example, a copy of a first piece of data 106 may be sent to each of temporal transformations 124 and processed at the same time by temporal transformations 124. Following the processing of the first piece of data by temporal transformations 124, a copy of a second piece of data 106 may be sent to and processed by each of temporal transformations 124. In this manner, one piece at a time of data 106 is processed by temporal transformations 124.

In this illustrative example, temporal transformations 124 are processes that generate pieces 116 of temporal data 114 from data 106. For example, temporal transformations 124 use data 106 to calculate probabilities that states 118 are correct for object 120.

As another example, a temporal transformation in temporal transformations 124 may calculate a probability that object 120 is accelerating. In this depicted example, the temporal transformation calculates the probability from a sequence of images in data 106 that include the object.

Another temporal transformation in temporal transformations 124 may calculate a probability that object 120 is moving relative to another object. In this illustrative example, the temporal transformation calculates the probability of whether object 120 is moving from a sequence of images in data 106 taken from the other object.

In one illustrative example, pieces 116 of temporal data 114 include the probabilities for states 118 of object 120, states 118 for which the probabilities are calculated, and times for which the probabilities exist for states 118. For example, a piece in pieces 116 may have a first probability for a first state in states 118 at a first time, and another piece in pieces 116 may have a second probability for a second state in states 118 at a second time.

Temporal transformations 124 may also calculate values for states 118 of object 120 from data 106. These values describe states 118.

In one illustrative example, pieces 116 of temporal data 114 include values describing states 118. These values may include at least one of time values, rates of change, vector information, or other suitable types of values for states 118 of object 120.

For example, the temporal transformation in temporal transformations 124 that calculates the probability that object 120 is accelerating may also calculate the probability for an amount of acceleration of object 120 at time t. In this example, the piece of temporal data identified by the temporal transformation may include the probability for the amount of acceleration of object 120 at time t.

In the illustrative examples, information processor 102 places pieces 116 of temporal data 114 in order 126 as pieces 116 of temporal data 114 are generated by temporal transformations 124 to form sequence 128 of temporal data 114. Order 126 is an arrangement of pieces 116 of temporal data 114 in this particular example. This arrangement of pieces 116 of temporal data 114 identifies which ones of pieces 116 of temporal data 114 come before others of pieces 116. This arrangement of pieces 116 of temporal data 114 also includes information about a duration of time between each of pieces 116 of temporal data 114. For example, order 126 may specify a time delay between a first piece of temporal data and a second piece of temporal data in pieces 116 of temporal data 114.

As depicted, order 126 of pieces 116 of temporal data 114 placed in sequence 128 is based on priority 130 of when pieces 116 of temporal data 114 should be processed. In the illustrative example, order 126 of pieces 116 of temporal data 114 enables performing an action. For example, a timing difference specified in order 126 between the first piece of temporal data and the second piece of temporal data in pieces 116 may indicate the probability that at least one of the first piece of temporal data or the second piece of temporal data is a correct state of object 120.

In this illustrative example, sequence 128 of temporal data 114 may be stored in data storage system 104. In this manner, sequence 128 of temporal data 114 may then be accessed by information processor 102 for further processing.

As depicted, sequence 128 of temporal data 114 stored in data storage system 104 may be more easily accessed as compared to data 106 stored in data storage system 104. In this illustrative example, information processor 102 accesses sequence 128 of temporal data 114 to identify an action based on sequence 128 of temporal data 114. In effect, information processor 102 preprocesses data 106 to place data 106 into a form for quicker access with less use of resources when information processor 102 is identifying actions to perform.

As depicted, data storage system 104 may take a number of forms. In one illustrative example, data storage system 104 includes database 132. Database 132 may be selected from at least one of a hierarchical database, a relational database, a hierarchical database, or some other suitable type of database.

In the illustrative example, a hierarchical database is a database in which data is organized using a treelike structure. A relational database is a collection of data organized as a set of tuples grouped by associations or relationships.

In one illustrative example, data 106 is received from source 134. In another illustrative example, data 106 may be stored in database 132, or some other database. In still another illustrative example, data 106 may be received from a hardware device such as a sensor system. The sensor system may be a camera, an infrared sensor, an ultrasonic sensor, or some other suitable type of sensor system. In still another illustrative example, data 106 may be received from a computer, a network, a mobile phone, a laptop computer, a controller, or some other suitable device.

After processing data 106, sequence 128 of temporal data 114 is present in which pieces 116 of temporal data 114 have order 126. Sequence 128 of temporal data 114 may be processed or stored in data storage system 104 for later processing.

When information processor 102 may process sequence 128 of temporal data 114 and perform action 136 based on processing sequence 128 of temporal data 114, action 136 may be selected from one of generating an alert, generating a warning, sending a message, displaying an indicator on a display system, displaying an indicator identifying a location of object 120, tracking object 120, identifying object 120, or other suitable actions. In the illustrative examples, identifying and performing action 136 may occur more quickly using sequence 128 of temporal data 114 generated by information processor 102 from data 106 as compared to currently used techniques for processing.

As depicted, information processor 102 overcomes technical problems with accessing data as quickly as desired without the amount of processing resources needed with currently used techniques to access data in a database. With this solution, information processor 102 has a technical effect of enabling performing action 136 more quickly than currently possible.

In the illustrative example, computer system 112 operates as a special purpose computer system in which information processor 102 in computer system 112 enables faster access to data stored in a data storage system, such as a database. In particular, information processor 102 transforms computer system 112 into a special purpose computer system as compared to currently available general computer systems that do not have information processor 102.

Additionally, computer system 112 performs a transformation of data. For example, information processor 102 in computer system 112 changes data 106 into temporal data 114. States 118 are identified from data 106. As part of the transformation of data 106 into temporal data 114, pieces 116 of temporal data 114 are placed into sequence 128 of temporal data 114 based on priority 130.

Figure 2:
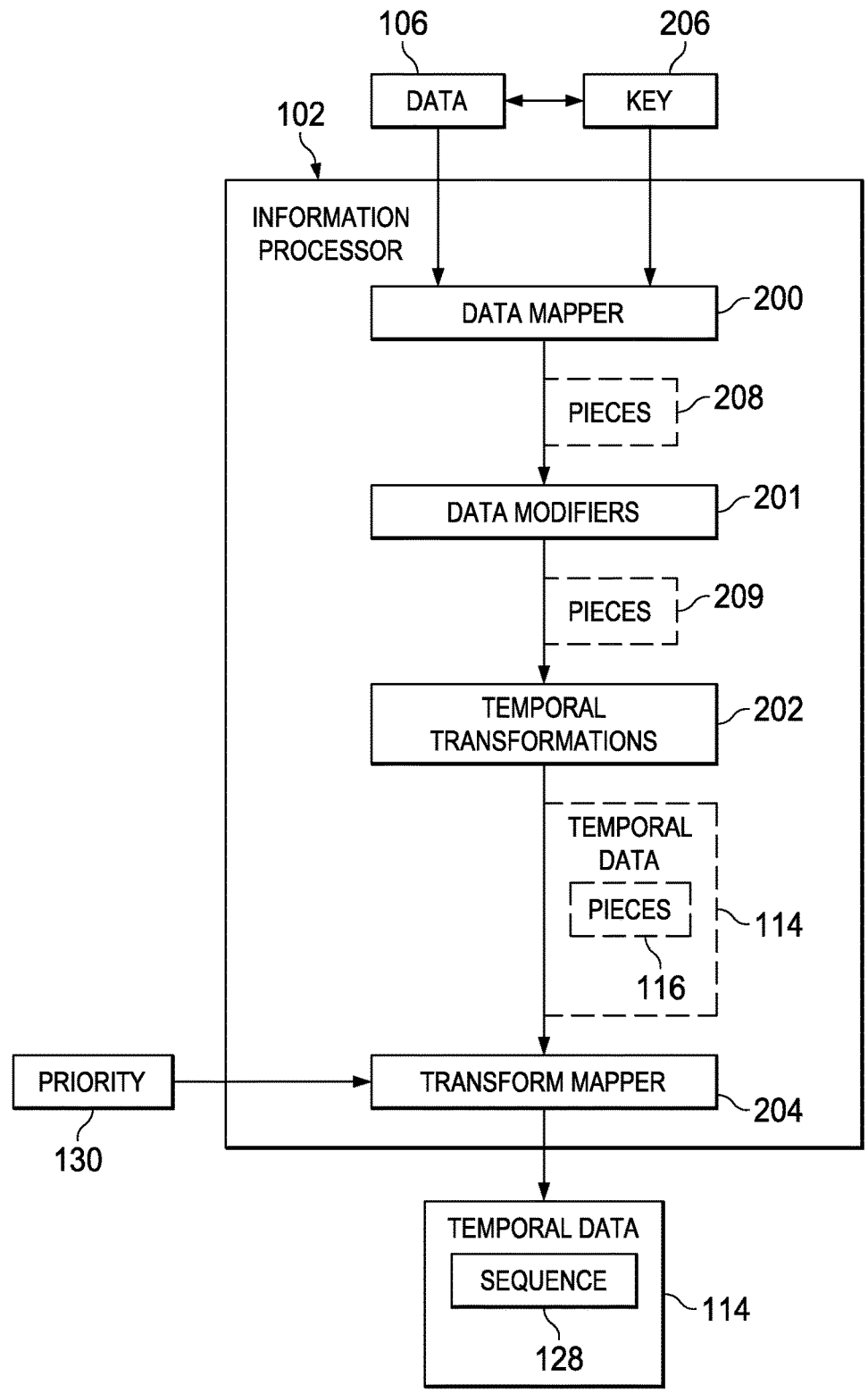
FIG. 2 is an illustration of a block diagram of data flow in generating a sequence of temporal data for an object in accordance with an illustrative embodiment.

With reference next to FIG. 2, an illustration of a block diagram of data flow in generating a sequence of temporal data for an object is depicted in accordance with an illustrative embodiment. In this figure, an example of data flow used to identify sequence 128 of temporal data 114 for states 118 of object 120 in FIG. 1 is shown. In this illustrative example, information processor 102 includes data mapper 200, data modifiers 201, temporal transformations 202, and transform mapper 204.

As depicted, data mapper 200 identifies pieces of data 106 using key 206. In this illustrative example, key 206 is a group of pointers to the pieces of data 106. Data mapper 200 generates pieces 208. Pieces 208 are copies of the pieces of data 106 pointed to by the group of pointers in key 206. "A group of items" is one or more items. For example, "a group of pointers" is one or more pointers.

Data modifiers 201 receive pieces 208 from data mapper 200. Data modifiers 201 process pieces 208 of data 106 in a first state to form pieces 209 of data 106 in a second state. Data modifiers 201 generate pieces 209 using at least one of a vector matrix multiplication on pieces 208, an image processing algorithm on pieces 208, or some other suitable algorithm for processing data in a first state to form data in a second state.

Temporal transformations 202 receive pieces 209 from data modifiers 201. Temporal transformations 202 then process pieces 209 of data 106 in parallel to generate pieces 116 of temporal data 114. Temporal transformations 202 are examples of temporal transformations 124 in FIG. 1.

In this illustrative example, transform mapper 204 receives pieces 116 of temporal data 114 from temporal transformations 202. As depicted, transform mapper 204 generates sequence 128 of temporal data 114 based on priorities in priority 130 that identify when pieces 116 of temporal data 114 should be processed.

For example, a first priority in priority 130 for a first piece of temporal data 114 in pieces 116 may indicate that the first piece of temporal data 114 is for a state of object 120 of FIG. 1 that is of lower relative importance than a second priority in priority 130 for a second piece of temporal data 114 in pieces 116. In this example, transform mapper 204 places the second piece of temporal data 114 into sequence 128 in the first position in sequence 128 because the second piece of temporal data 114 is of higher relative importance. Transform mapper 204 then places the first piece of temporal data 114 into sequence 128 in the second position in sequence 128 because the first piece of temporal data is of lower relative importance.

Figure 3:
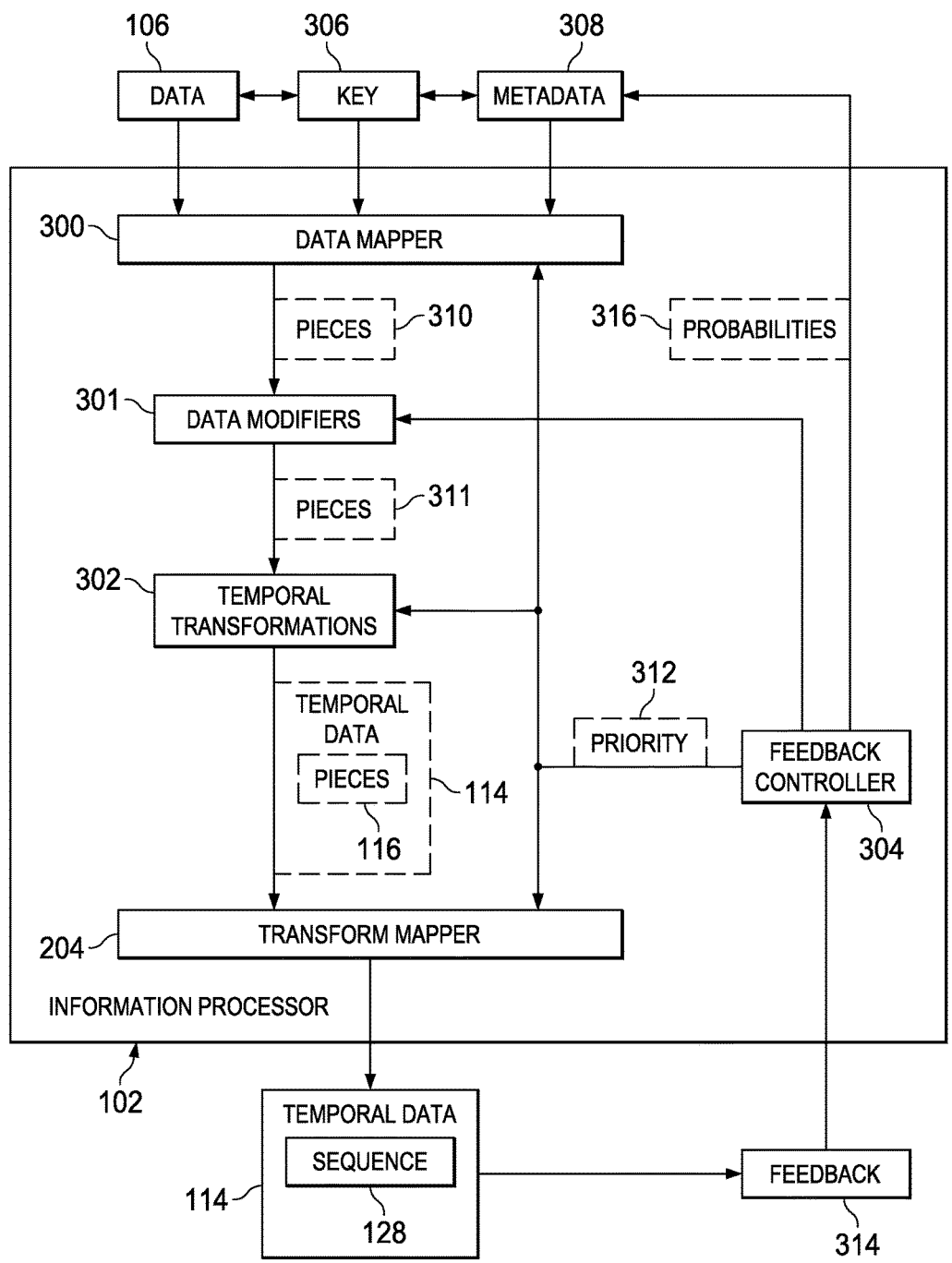
FIG. 3 is an illustration of a block diagram of data flow in generating a sequence of temporal data for an object in accordance with an illustrative embodiment.

Turning to FIG. 3, an illustration of a block diagram of data flow in generating a sequence of temporal data for an object is depicted in accordance with an illustrative embodiment. In this figure, another example of data flow used to identify sequence 128 of temporal data 114 for object 120 of FIG. 1 is shown. In this illustrative example, information processor 102 includes data mapper 300, data modifiers 301, temporal transformations 302, transform mapper 204, and feedback controller 304.

As depicted, data mapper 300 identifies pieces 310 of data 106 using key 306. Data mapper 300 also identifies pieces of metadata 308 using key 306. Data mapper 300 identifies these pieces to make copies. Data mapper 300 sends these copies to data modifiers 301 for processing to form pieces 311 of at least one of data 106 or metadata 308. Temporal transformations 302 receive pieces 311 for further processing to form pieces 116 of temporal data 114. In this illustrative example, key 306 is a group of pointers to the pieces of data 106 and the pieces of metadata 308.

In this illustrative example, metadata 308 is data describing the types of data used in information processing environment 100 of FIG. 1. Metadata 308 describes at least one of data 106, processed data 108, temporal data 114, points in time 122, order 126, sequence 128, priority 130, action 136, an object affected by pieces 116 of temporal data 114, or any other suitable type of data in information processing environment 100 as shown in FIG. 1.

As depicted, metadata 308 may include additional temporal data. For example, metadata 308 may describe a time when a piece of data 106 was generated. As another example, metadata 308 may describe a time when an object was affected by pieces 116 of temporal data 114.

As still another example, metadata 308 may include probabilities for states 118 of object 120. In this example, the probabilities for states 118 of object 120 may be identified from sequence 128 of temporal data 114 in the form of feedback 314 through feedback controller 304.

Metadata 308 may include pointers to additional information about data 106 in information processing environment 100. For example, metadata 308 may include a pointer to source 134 shown in FIG. 1 of the piece of data 106.

Metadata 308 may also be data that describes other components in information processing environment 100. In the illustrative example, metadata 308 may describe at least one of information processor 102, data storage system 104, computer system 112, object 120, temporal transformations 124, database 132, or source 134. For example, metadata 308 may include a location where states 118 of object 120 are located. As another example, metadata 308 may include pointers to a group of objects associated with object 120 in information processing environment 100.

Data mapper 300 generates pieces 310 from copies of the pieces of data 106 and copies of the pieces of metadata 308. As depicted, pieces 310 are copies of the pieces of data 106 and metadata 308 that data modifiers 301 use to generate pieces 311. Pieces 311 are used by temporal transformations 302 to generate pieces 116 of temporal data 114.

As depicted, data mapper 300 sends pieces 310 to data modifiers 301 based on priorities in priority 312. These priorities specify when pieces 116 of temporal data 114 should be processed. Priority 312 is an example of priority 130 in FIG. 1. Processing pieces 116 of temporal data 114 based on priorities in priority 312 ensures that pieces 116 of temporal data 114 are generated in order based on priority 312.

In this illustrative example, feedback controller 304 generates priority 312 based on feedback 314. Feedback 314 is a level of importance for a piece of temporal data 114 in pieces 116 of temporal data 114. For example, feedback 314 may indicate that the piece of temporal data 114 has a higher level of importance than other pieces of temporal data 114 in pieces 116.

In the illustrative example, the piece of temporal data 114 may be used to identify action 136, and the other pieces of temporal data 114 may be used to identify other actions. When pieces 116 of temporal data 114 are used to identify actions, feedback 314 indicating that the piece of temporal data 114 has a higher level of importance is also an indication that action 136 has a higher level of importance than the other actions.

As depicted, feedback 314 may be generated by at least one of transform mapper 204, a learning system, or user input. In the illustrative example, feedback 314 from transform mapper 204 includes sequence 128 of temporal data 114. In this illustrative example, the learning system identifies through feedback 314 which pieces 116 of temporal data 114 are needed to identify action 136.

Feedback controller 304 generates priority 312 based on feedback 314 to control the order of pieces 116 placed into sequence 128 by transform mapper 204. Feedback controller 304 identifies the order of pieces 116 by sorting levels of importance for pieces 116 received in feedback 314. For example, when a plurality of actions is identified from sequence 128, feedback controller 304 uses feedback 314 to identify the order of pieces 116 from which the plurality of actions is identified. In this illustrative example, feedback controller 304 generates priority 312 to enable identifying from sequence 128 the action with the highest priority in the plurality of actions.

As depicted, feedback controller 304 generates probabilities 316 for states 118 of object 120. In this illustrative example, feedback controller 304 places probabilities 316 into metadata 308. For example, feedback controller 304 may place probabilities 316 into metadata 308 to enable extracting additional information.

Data modifiers 301 receive pieces 310 of data 106 and metadata 308 from data mapper 300. Data modifiers 301 process pieces 310 of data 106 and metadata 308 in a first state in parallel to form pieces 311 of data 106 and metadata 308 in a second state. Data modifiers 301 generate pieces 311 using at least one of a vector matrix multiplication on pieces 310, an image processing algorithm on pieces 310 or some other suitable algorithm for processing data 106 and metadata 308 in a first state to form data 106 and metadata 308 in a second state.

Temporal transformations 302 receive pieces 311 from data modifiers 301. Temporal transformations 302 then process pieces 311 in parallel to generate pieces 116 of temporal data 114. Temporal transformations 302 are examples of temporal transformations 124 in FIG. 1.

In this illustrative example, the amount of resources allocated to temporal transformations 302 is based on the priorities in priority 312. These resources are components of computer system 112 used to process pieces 310. For example, these resources may include at least one of memory, processor units, communications units, or other suitable types of components in computer system 112.

Transform mapper 204 receives pieces 116 of temporal data 114 from temporal transformations 302. As depicted, transform mapper 204 then generates sequence 128 of temporal data 114 based on the priorities in priority 312 that identify when pieces 116 of temporal data 114 should be processed.

Figure 4:
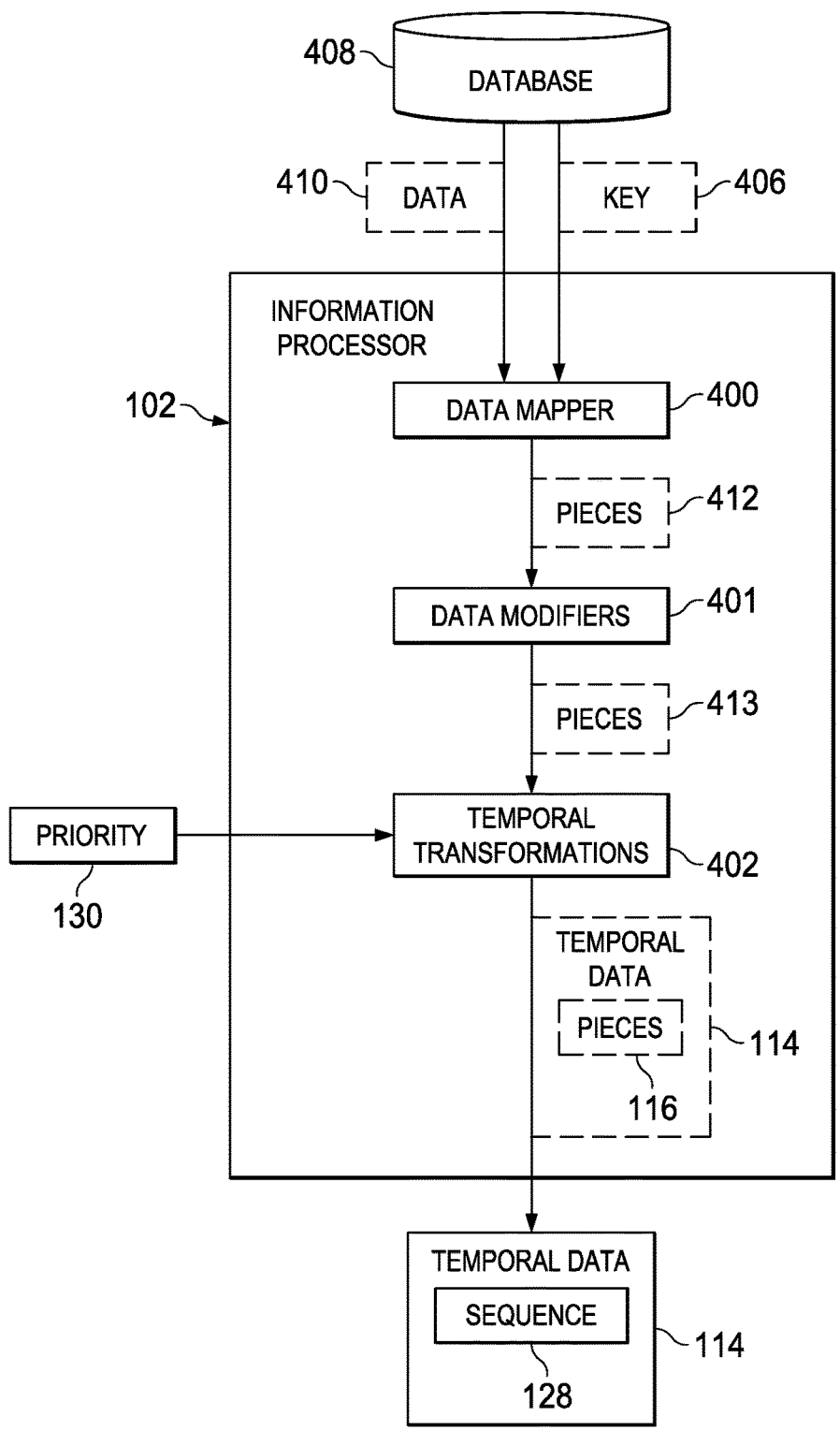
FIG. 4 is an illustration of a block diagram of data flow in generating a sequence of temporal data for an object from a database in accordance with an illustrative embodiment.

Turning next to FIG. 4, an illustration of a block diagram of data flow in generating a sequence of temporal data for an object from a database is depicted in accordance with an illustrative embodiment. In this figure, a further example of data flow used to identify sequence 128 of temporal data 114 for object 120 of Figure is shown. In this illustrative example, information processor 102 includes data mapper 400, data modifiers 401, and temporal transformations 402.

As depicted, data mapper 400 identifies key 406 in database 408. In this illustrative example, key 406 is a group of pointers in database 408 that point to pieces of data 410. Data 410 is an example of data 106 in FIG. 1.

Data mapper 400 retrieves data 410 from database 408. For example, data mapper 400 may identify pieces of data 410 using key 406.

In this illustrative example, data mapper 400 generates pieces 412. Pieces 412 are copies of the pieces of data 410 pointed to by the group of pointers in key 406.

Data modifiers 401 receive pieces 412 from data mapper 400. Data modifiers 401 process pieces 412 of data 410 in a first state in parallel to form pieces 413 of data 410 in a second state. Data modifiers 401 generate pieces 413 using at least one of a vector matrix multiplication on pieces 412, an image processing algorithm on pieces 412 or some other suitable algorithm for processing data in a first state to form data in a second state.

The state of object 120 for pieces 413 of data 410 may be a condition of object 120. For example, when object 120 is a brake light of a car, pieces 412 of data 410 in the first state may be values for bright red pixels in an image for the brake light. In this example, pieces 413 of data 410 in the second state may be a value indicating that the brake light of the car is on. In this example, data modifiers 401 generate the value that the brake light is on.

Temporal transformations 402 receive pieces 413 from data modifiers 401. Temporal transformations 402 then process pieces 413 of data 410 in parallel to generate pieces 116 of temporal data 114. Temporal transformations 402 are examples of temporal transformations 124 in FIG. 1.

In this illustrative example, the amount of resources used by a temporal transformation in temporal transformations 402 is based on a priority in priority 130 for the piece of temporal data 114 in pieces 116 that is generated by the temporal transformation. As depicted, temporal transformations 402 place pieces 116 of temporal data 114 into sequence 128 based on priority 130.

Using resources based on priority 130 to generate pieces 116 enables temporal transformations 402 to place pieces 116 of temporal data 114 into sequence 128 over time in an order based on priority 130. Placing temporal data 114 over time into sequence 128 reduces the requirement to synchronize the placing of pieces 116 into sequence 128. Generating sequence 128 based on priority 130 ensures that a subsequent sorting of sequence 128 is not required to place pieces 116 in sequence 128 in an order that is based on priority 130.

Figure 5:
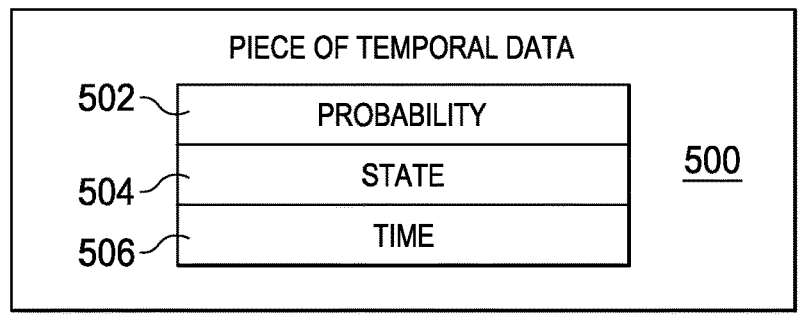
FIG. 5 is an illustration of a block diagram of a piece of temporal data in accordance with an illustrative embodiment.

In FIG. 5, an illustration of a block diagram of a piece of temporal data is depicted in accordance with an illustrative embodiment. In this illustrative example, piece of temporal data 500 is an example of a piece of temporal data in pieces 116 of temporal data 114 in FIG. 1.

In this illustrative example, piece of temporal data 500 is a data structure that includes a number of different types of information. In this example, piece of temporal data 500 is generated by a temporal transformation. As depicted, piece of temporal data 500 includes probability 502, state 504, and time 506.

Probability 502 is a description of the probability that state 504 is correct for time 506. Probability 502 describes the probability that state 504 is correct for time 506 using at least one of a magnitude or a percentage. A magnitude that describes a probability is a value on a scale relative to other values on the scale. For example, the magnitude may be a number on a scale between 0 and 100, with 100 indicating the highest probability on the scale and 0 indicating zero probability on the scale.

State 504 is an identifier that identifies a state of an object. State 504 is at least one of a name, a number, a pointer to data structure, or any other suitable type of identifier that describes state 504 of the object.

Time 506 is information specifying when probability 502 is present for state 504 of the object. Time 506 is at least one of a time stamp, a range of time, a sequence of time stamps, a sequence of time intervals, or any other suitable type of information for specifying when a state is present for an object.

Figure 6:
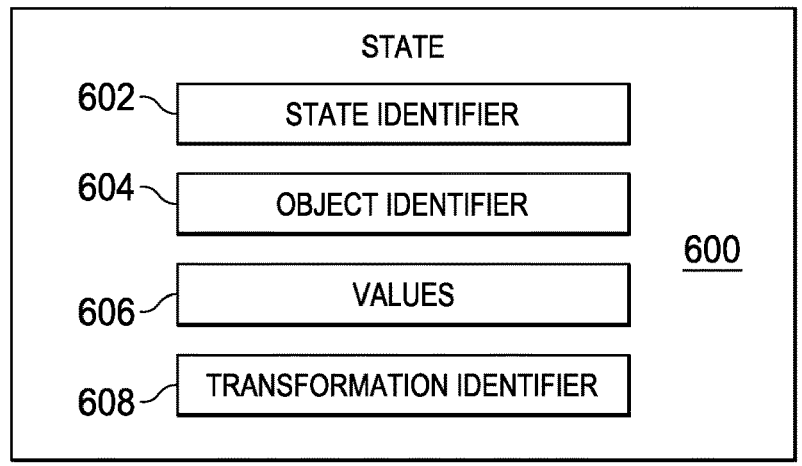
FIG. 6 is an illustration of a block diagram of a state in accordance with an illustrative embodiment.

Turning to FIG. 6, an illustration of a block diagram of a state is depicted in accordance with an illustrative embodiment. In this illustrative example, state 600 is an example of a state in states 118 of object 120 in FIG. 1 and state 504 in FIG. 5.

In this illustrative example, state 600 is a data structure that includes a number of different types of information. In this example, state 600 is generated by a temporal transformation. As depicted, state 600 includes state identifier 602, object identifier 604, values 606, and transformation identifier 608.

State identifier 602 is an identification of a state for an object. State identifier 602 is at least one of a name, a number, or any other suitable type of identifier that describes a state of the object.

Object identifier 604 is an identification of the object for which state 600 is generated. For example, object identifier 604 may be a pointer to object 120 in FIG. 1.

In this illustrative example, values 606 describe the state of the object. Values 606 include at least one of a time value, a rate of change, a vector, or other suitable types of values that describe state 600. For example, if state identifier 602 is "decelerating," a value in values 606 may be the deceleration rate of the object over time. In this example, the deceleration rate may be calculated by the temporal transformation that generated state 600.

As depicted, transformation identifier 608 in state 600 points to the temporal transformation that generated state 600. For example, transformation identifier 608 may point to a temporal transformation in temporal transformations 124 in FIG. 1.

Figure 7:
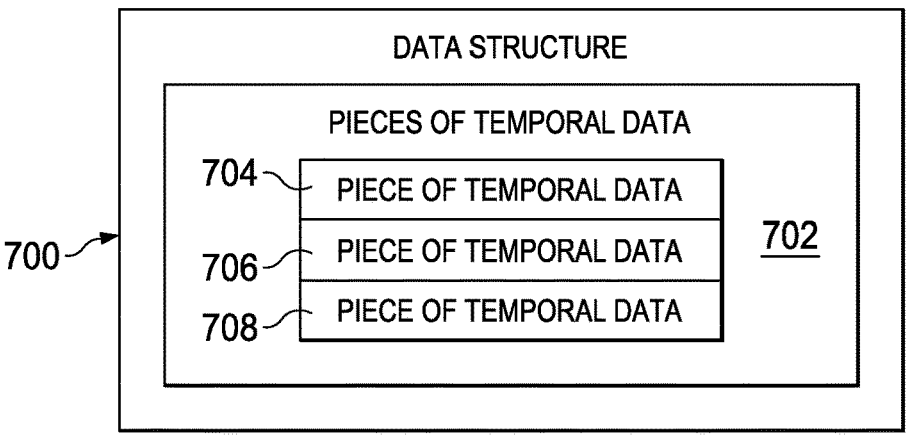
FIG. 7 is an illustration of a block diagram of a data structure in accordance with an illustrative embodiment.

Turning next to FIG. 7, an illustration of a block diagram of a data structure is depicted in accordance with an illustrative embodiment. In this illustrative example, data structure 700 is an example of a data structure in data storage system 104 where sequence 128 of temporal data 114 in FIG. 1 is stored.

As depicted, data structure 700 includes pieces of temporal data 702. Data structure 700 may be selected from at least one of an array, a linked list, a queue, or any other suitable type of list.

In this illustrative example, pieces of temporal data 702 include piece of temporal data 704, piece of temporal data 706, and piece of temporal data 708. The position of these pieces of temporal data in pieces of temporal data 702 forms a sequence for the pieces of temporal data 702. The sequence is an order in which pieces of temporal data 702 are arranged. The sequence is based on priority 130 in FIG. 1.

This sequence is an example of sequence 128 of temporal data 114 in FIGS. 1-4. Accessing pieces of temporal data 702 in the order that these pieces are arranged enables accessing these pieces based on priority 130.

The illustration of information processing environment 100 and the different components in information processing environment 100 in FIGS. 1-7 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, temporal transformations 402 may store sequence 128 of temporal data 114 in database 408. Temporal transformations 402 may generate another key in database 408 that points to sequence 128 of temporal data 114 in database 408.

As another example, temporal transformations 402 may store sequence 128 of temporal data 114 as an additional piece of data in data 410 in database 408. Then, in a subsequent use of information processor 102, data mapper 400 may map sequence 128 of temporal data 114 from the additional piece of data in data 410 into pieces 412. In other words, pieces 412 of data 410 processed by temporal transformations 402 may include pieces 116 of temporal data 114 previously generated by temporal transformations 402.

Figure 8:
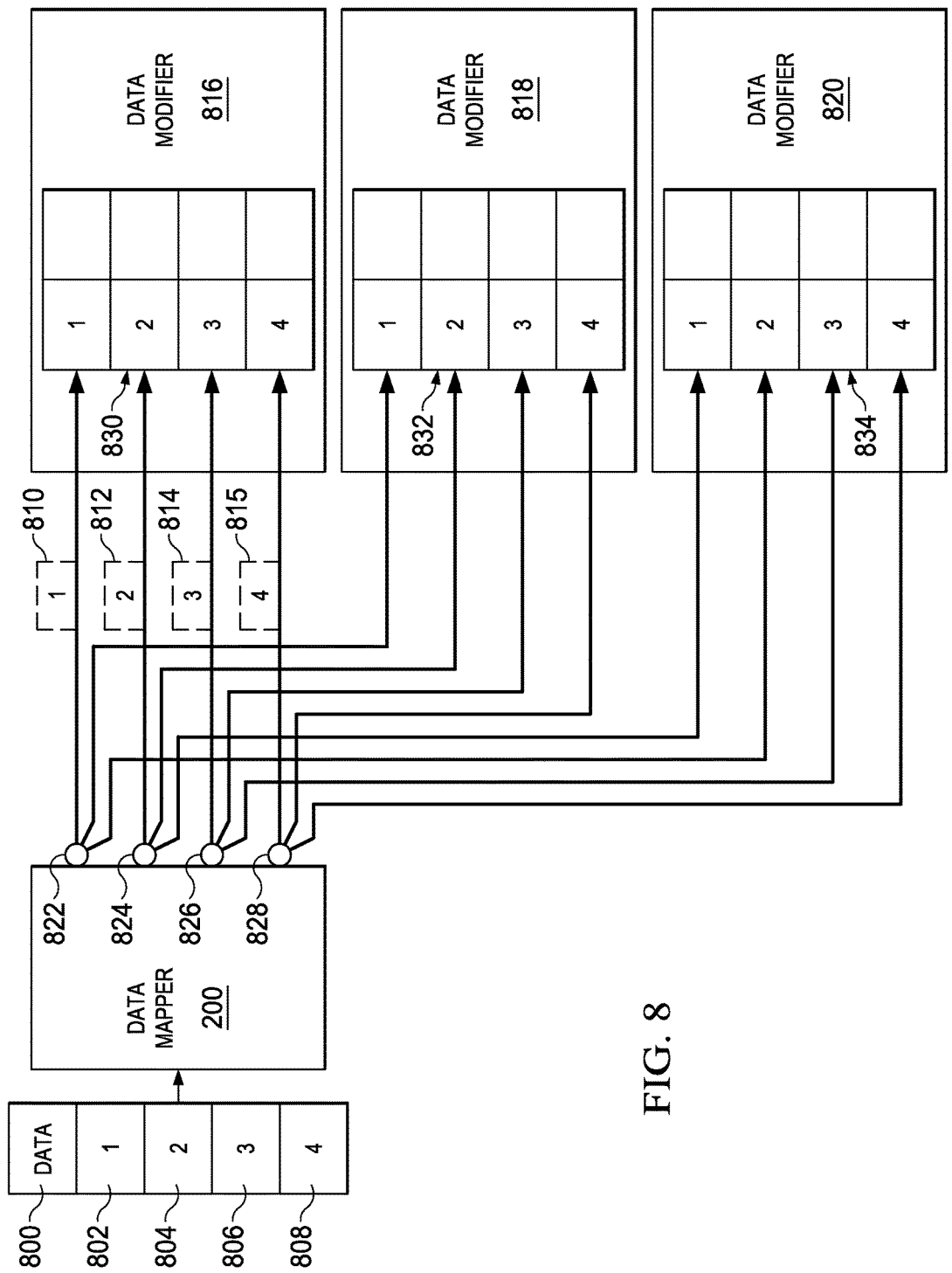
FIG. 8 is an illustration of temporal transformations in accordance with an illustrative embodiment.
Figure 9:
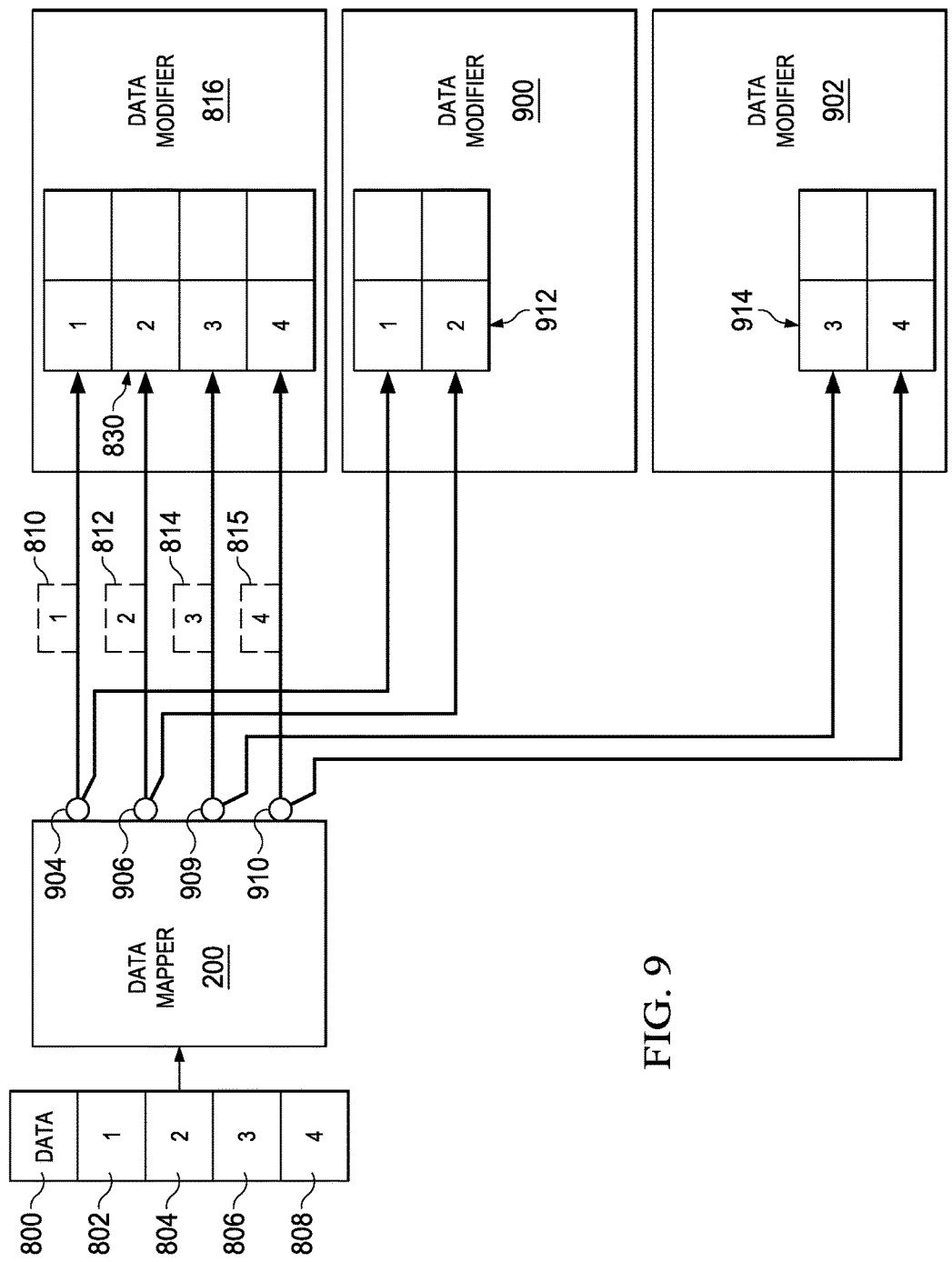
FIG. 9 is an illustration of temporal transformations in accordance with an illustrative embodiment.
Figure 10:
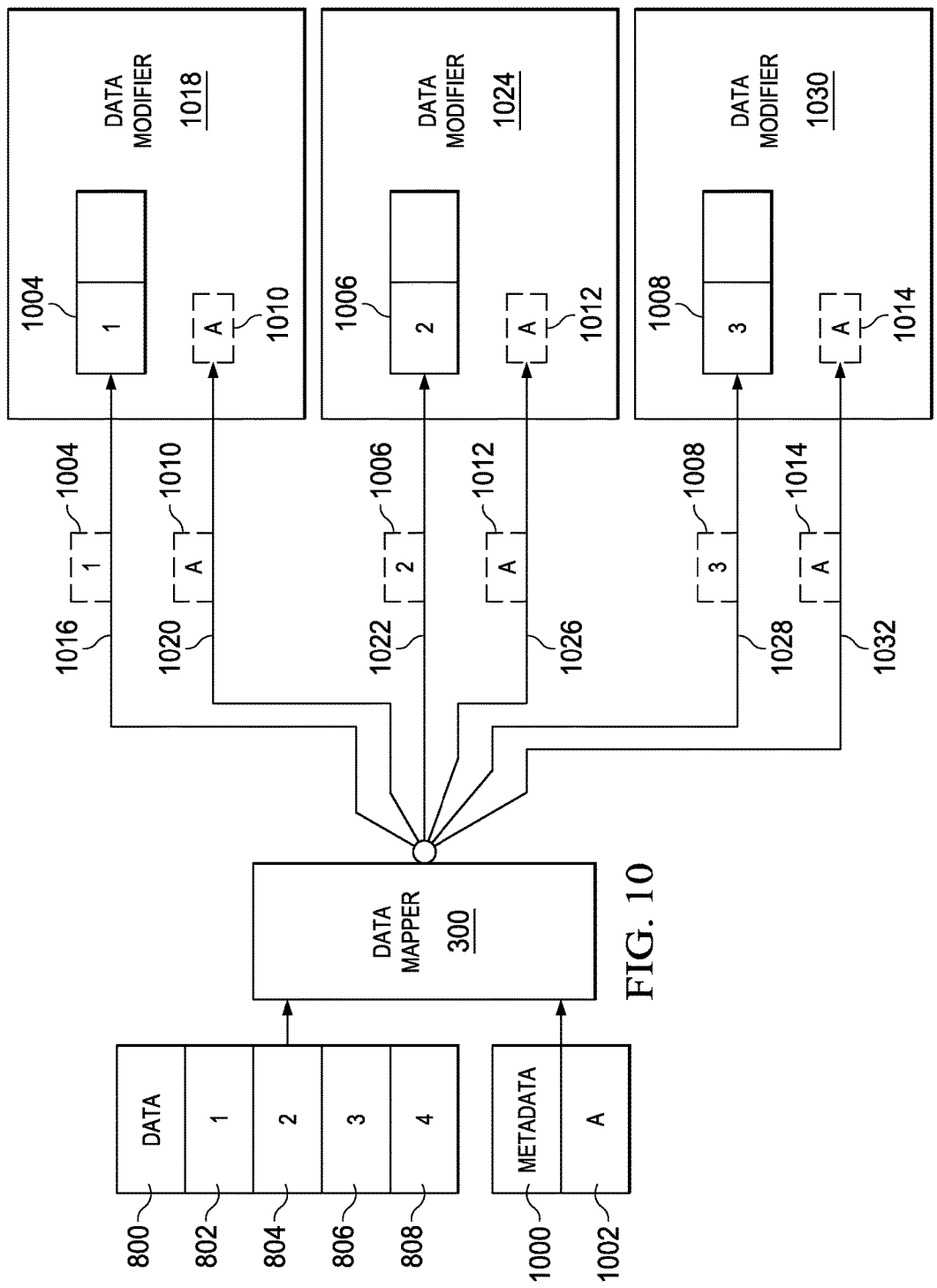
FIG. 10 is an illustration of temporal transformations in accordance with an illustrative embodiment.

FIGS. 8-10 illustrate examples of data modifiers receiving pieces of data from a data mapper. With reference now to FIG. 8, an illustration of data modifiers is depicted in accordance with an illustrative embodiment. In this illustrative example, data 800 is an example of data 106 in FIGS. 1-3. This illustration shows data mapper 200 sending copies of pieces of data 800 to data modifiers.

As depicted, data 800 includes piece 802, piece 804, piece 806, and piece 808. In this illustrative example, data mapper 200 makes copy 810 of piece 802, copy 812 of piece 804, copy 814 of piece 806, and copy 815 of piece 808.

Data mapper 200 sends copy 810 to data modifier 816, data modifier 818, and data modifier 820 in the direction of arrows 822. Data mapper 200 sends copy 812 to data modifier 816, data modifier 818, and data modifier 820 in the direction of arrows 824. Data mapper 200 sends copy 814 to data modifier 816, data modifier 818, and data modifier 820 in the direction of arrows 826. Data mapper 200 sends copy 815 to data modifier 816, data modifier 818, and data modifier 820 in the direction of arrows 828.

In this illustrative example, data modifier 816 receives copies 830 of the pieces of data 800, data modifier 818 receives copies 832 of the pieces of data 800, and data modifier 820 receives copies 834 of the pieces of data 800. Receiving these copies of the pieces of data 800 enables these data modifiers to process the pieces of data 800.

With reference next to FIG. 9, an illustration of data modifiers is depicted in accordance with an illustrative embodiment. This illustration shows data mapper 200 sending copies of pieces of data 800 to data modifier 816. This illustration also shows data mapper 200 sending copies of a first portion of the pieces of data 800 to data modifier 900 and copies of a second portion of the pieces of data 800 to data modifier 902.

In this illustrative example, data mapper 200 sends copy 810 to data modifier 816 and data modifier 900 in the direction of arrows 904. Data mapper 200 sends copy 812 to data modifier 816 and data modifier 900 in the direction of arrows 906. Data mapper 200 sends copy 814 to data modifier 816 and data modifier 902 in the direction of arrows 908. Data mapper 200 sends copy 815 to data modifier 816 and data modifier 902 in the direction of arrows 910. As depicted, data modifier 816 receives copies 830 of the pieces of data 800, data modifier 900 receives copies 912 of the first portion of the pieces of data 800, and data modifier 902 receives copies 914 of the second portion of the pieces of data 800.

In this illustrative example, data modifier 900 may process copies 912 substantially at the same time that data modifier 902 is processing copies 914 and data modifier 816 is processing copies 830.

Turning to FIG. 10, an illustration of data modifiers is depicted in accordance with an illustrative embodiment. In this illustrative example, metadata 1000 is an example of metadata 308 in FIG. 3. This illustration shows data mapper 300 sending pieces of data 800 to data modifiers.

This illustration also shows data mapper 300 sending a piece of metadata 1000 to the data modifiers. As depicted, metadata 1000 includes piece 1002.

In this illustrative example, data mapper 300 makes copy 1004 of piece 802 of data 800, copy 1006 of piece 804 of data 800, and copy 1008 of piece 806 of data 800. Data mapper 300 also makes copy 1010, copy 1012, and copy 1014 of piece 1002 of metadata 1000.

As depicted, data mapper 300 sends copy 1004 of piece 802 of data 800 in the direction of arrow 1016 to data modifier 1018. Data mapper 300 also sends copy 1010 of piece 1002 of metadata 1000 in the direction of arrow 1020 to data modifier 1018. As depicted, data modifier 1018 receives copy 1004 and copy 1010.

Data mapper 300 sends copy 1006 of piece 804 of data 800 in the direction of arrow 1022 to data modifier 1024. Data mapper 300 also sends copy 1012 of piece 1002 of metadata 1000 in the direction of arrow 1026 to data modifier 1024. As depicted, data modifier 1024 receives copy 1006 and copy 1012.

Data mapper 300 sends copy 1008 of piece 806 of data 800 in the direction of arrow 1028 to data modifier 1030. Data mapper 300 also sends copy 1014 of piece 1002 of metadata 1000 in the direction of arrow 1032 to data modifier 1030. As depicted, data modifier 1030 receives copy 1008 and copy 1014. Receiving these copies of the pieces of data 800 and metadata 1000 enables these data modifiers to process the pieces of data 800 and the pieces of metadata 1000 substantially at the same time.

Figure 11:
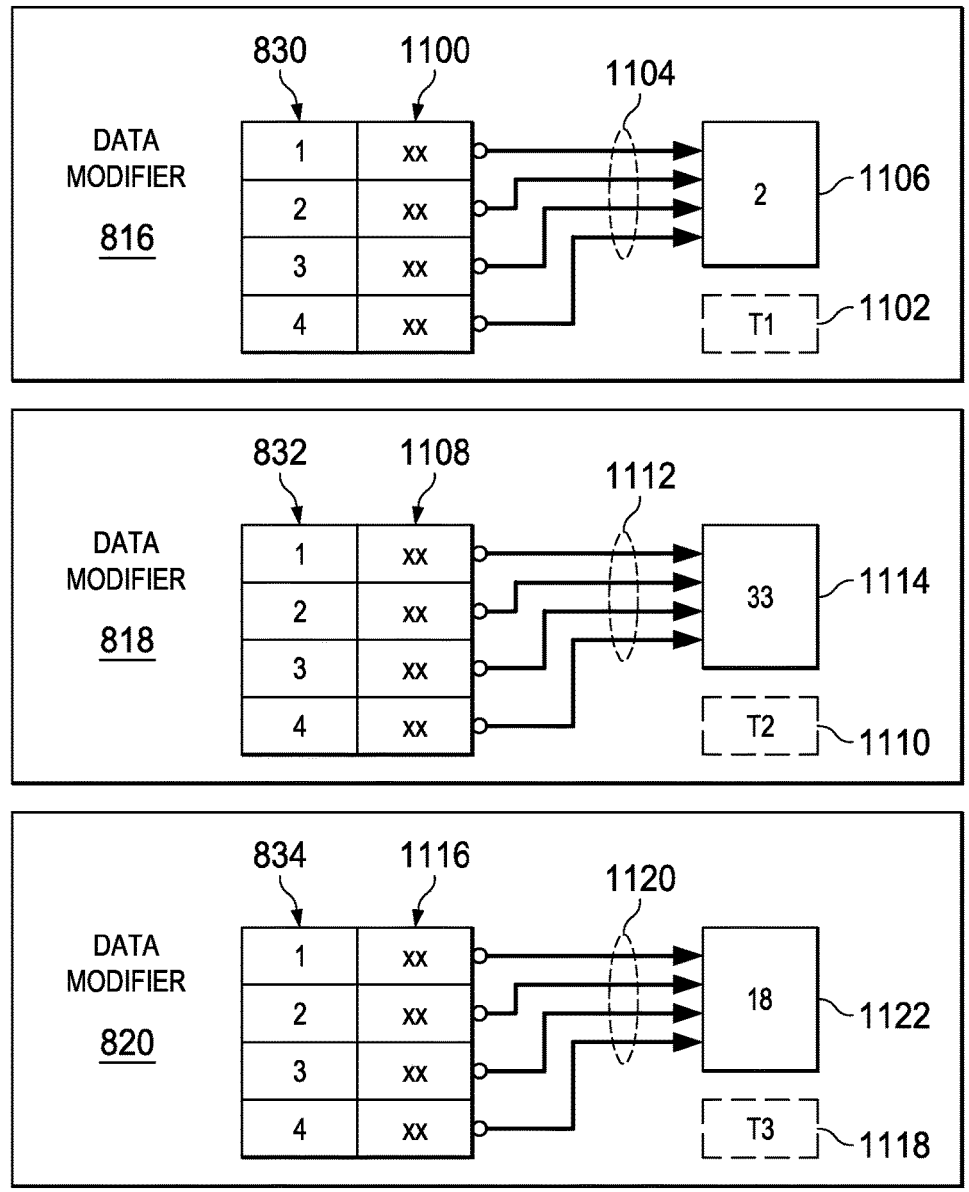
FIG. 11 is an illustration of temporal transformations processing data to calculate probabilities for states in accordance with an illustrative embodiment.

Turning next to FIG. 11, an illustration of data modifiers processing data is depicted in accordance with an illustrative embodiment. This illustration shows data modifier 816, data modifier 818, and data modifier 820 processing copies of pieces of data 800.

In this illustrative example, data modifier 816 processes pieces 830 of data 800 in a first state to form pieces 1100 of data 800 in a second state. For example, pieces 1100 of data 800 may be weightings used to calculate a probability of state 1102 of object 120.

As depicted by arrows 1104, data modifier 816 then sums pieces 1100 to create magnitude 1106. For example, magnitude 1106 may be the sum of weightings for the probability that state 1102 is correct for object 120 at time t. In this illustrative example, magnitude 1106 may be determined over time. For example, the sum of weightings that forms magnitude 1106 may be updated over time as the weightings in pieces 1100 of data 800 are generated.

Data modifier 818 processes pieces 832 of data 800 in a first state to form pieces 1108 of data 800 in a second state. As depicted by arrows 1112, data modifier 818 then sums pieces 1108 to create magnitude 1114. For example, magnitude 1114 may be the sum of weightings for the probability that state 1110 is correct for object 120 at time t.

Data modifier 820 processes pieces 834 of data 800 in a first state to form pieces 1116 of data 800 in a second state. As depicted by arrows 1120, data modifier 820 then sums pieces 1116 to create magnitude 1122. For example, magnitude 1122 may be the sum of weightings for the probability that state 1118 is correct for object 120 at time t.

Figure 12:
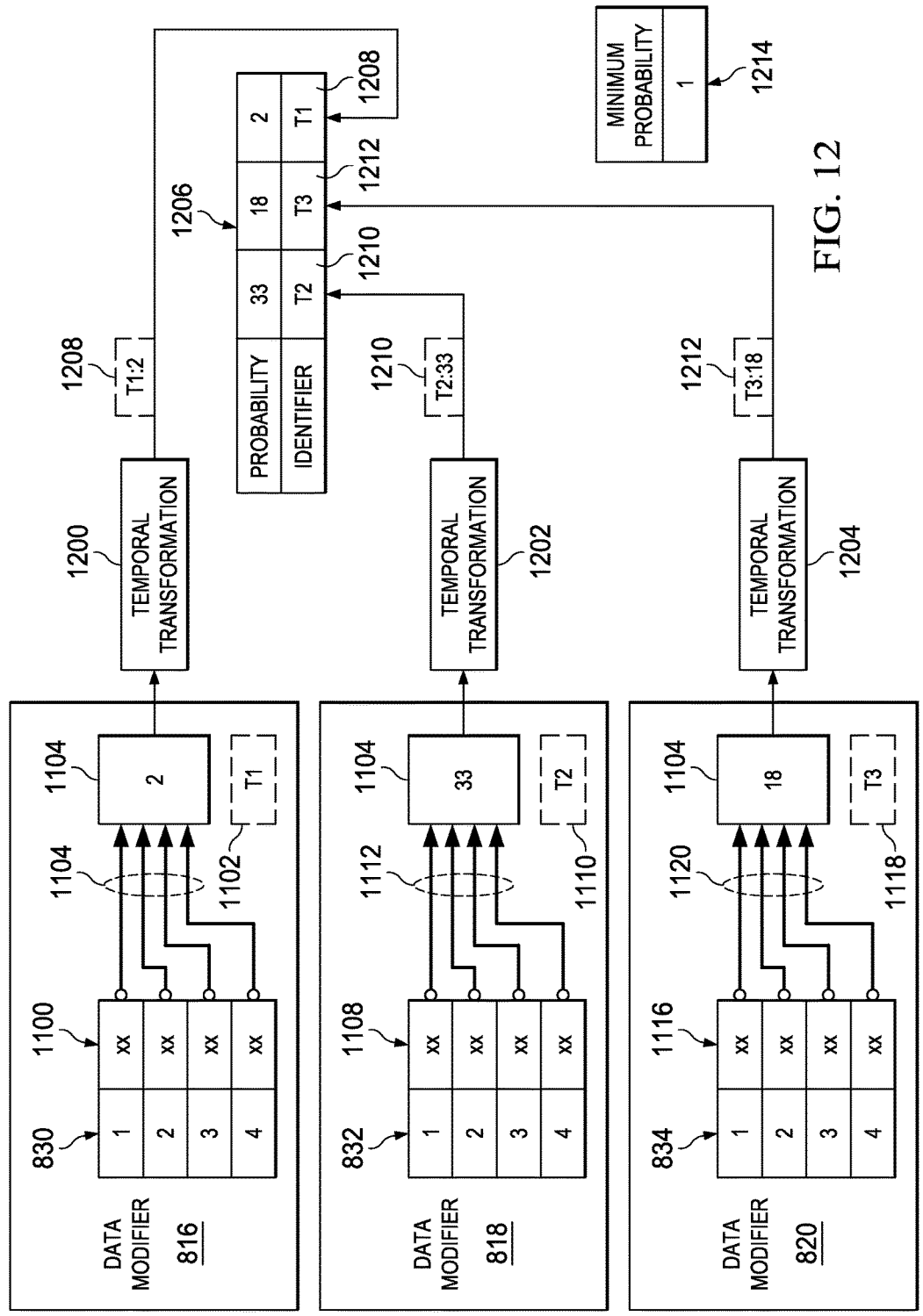
FIG. 12 is an illustration of temporal transformations generating a sequence of temporal data in accordance with an illustrative embodiment.

Turning now to FIG. 12, an illustration of temporal transformations generating a sequence of temporal data is depicted in accordance with an illustrative embodiment. This illustration shows temporal transformation 1200, temporal transformation 1202, and temporal transformation 1204 generating pieces of temporal data and placing the pieces of temporal data into data structure 1206. Data structure 1206 is an example of data structure 700 shown in block diagram form in FIG. 7.

As depicted, temporal transformation 1200 generates piece 1208 of temporal data 114, temporal transformation 1202 generates piece 1210 of temporal data 114, and temporal transformation 1204 generates piece 1212 of temporal data 114. Piece 1208, piece 1210, and piece 1212 are examples of pieces 116 of temporal data 114.

In this illustrative example, these temporal transformations place these pieces of temporal data 114 into data structure 1206. As depicted, these temporal transformations place the pieces of temporal data into data structure 1206 in an order that is based on the probabilities that the states are correct for object 120 at time t.

In this illustrative example, the probabilities are magnitudes generated by the data modifiers. In the depicted example, the probability that state 1102 is correct is magnitude 1106, the probability that state 1110 is correct is magnitude 1114, and the probability that state 1118 is correct is magnitude 1122.

Temporal transformation 1202 places piece 1210 into the first piece of temporal data in data structure 1206. Piece 1210 is placed into the first piece of temporal data in data structure 1206 because the probability in piece 1210 is higher than the probability in piece 1208 and the probability in piece 1212. Temporal transformation 1204 places piece 1212 into the second piece of temporal data in data structure 1206. Piece 1212 is placed into the second piece of temporal data in data structure 1206 because the probability in piece 1212 is lower than the probability in piece 1210 and higher than the probability in piece 1208.

Temporal transformation 1200 places piece 1208 into the third piece of temporal data in data structure 1206. Piece 1208 is placed into the third piece of temporal data in data structure 1206 because the probability in piece 1208 is lower than the probability in piece 1210 and the probability in piece 1212.

Temporal transformation 1100 determines whether piece 1208 meets minimum probability 1214 to place pieces into data structure 1206. Temporal transformation 1200 does not place piece 1208 into data structure 1206 when a comparison of the probability in piece 1208 and the probability in minimum probability 1214 indicates that piece 1208 should not be placed into data structure 1206.

Minimum probability 1214 is a minimum probability for placing pieces into data structure 1206. This minimum probability may be identified by a learning system. In other words, this minimum probability filters which pieces of temporal data are stored in data structure 1206.

Figure 13:
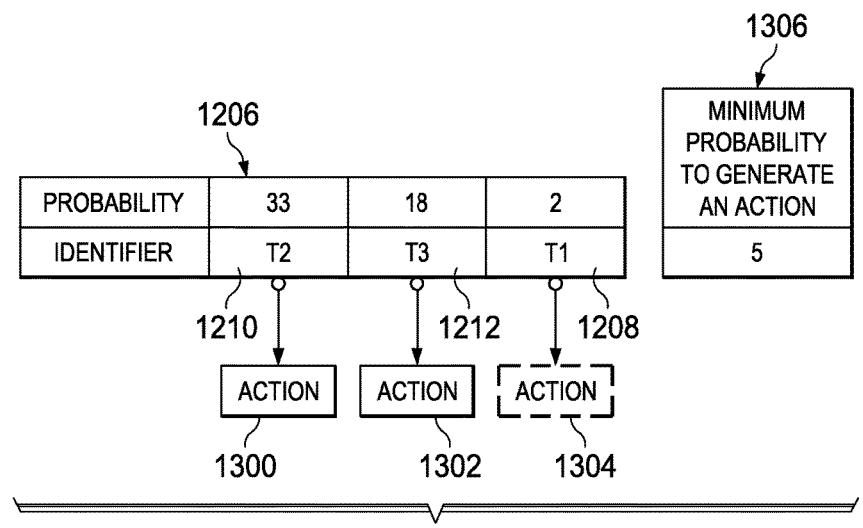
FIG. 13 is an illustration of actions generated from pieces of temporal data in accordance with an illustrative embodiment.

Turning to FIG. 13, an illustration of actions generated from pieces of temporal data is depicted in accordance with an illustrative embodiment. In this illustrative example, action 1300 and action 1302 are examples of action 136 in FIG. 1.

In this illustrative example, action 1300 is to display an indication that a car is braking, and action 1302 is to display an indication that the car is not braking. Action 1304 is to display an indication that the car has stopped braking.

As depicted, action 1300 is generated based on piece 1210 of temporal data 114 for object 120. In this illustrative example, piece 1210 of temporal data 114 for object 120 is an indication that the brake lights of the car are on. For example, action 1300 may be generated when state t2 is identified for object 120 at time t. Action 1300 is the first action generated from data structure 1206 because piece 1210 is the first piece of temporal data in data structure 1206.

Action 1302 is generated based on piece 1212 of temporal data 114 for object 120. In this illustrative example, piece 1212 of temporal data 114 for object 120 is an indication that the turn signals of the car are on. For example, action 1302 may be generated when state t3 is identified for object 120 at time t. Action 1302 is the second action generated from data structure 1206 because piece 1212 is the second piece of temporal data in data structure 1206.

In this illustrative example, action 1304 is not generated. In this illustrative example, piece 1208 of temporal data 114 for object 120 is an indication that the running lights of the car are on and not the brake lights. Action 1304 is not generated when a comparison of the probability in piece 1208 and the probability in minimum probability to generate an action 1306 indicates that action 1304 should not be generated.

Minimum probability to generate an action 1306 is a minimum probability for actions to be generated based on a piece of temporal data for an object. This minimum probability may be identified by a learning system. In other words, this minimum probability filters which actions are generated from the pieces of temporal data in data structure 1206.

As depicted, action 1304 is not generated based on piece 1308 because the 2 percent likelihood that state t1 is correct in piece 1208 does not exceed the 5 percent minimum in minimum probability to generate an action 1306. In other words, action 1304 is not generated based on the 2 percent likelihood that state t1 is correct for object 120 at time t not exceeding the 5 percent minimum probability required to generate an action.

Figure 14:
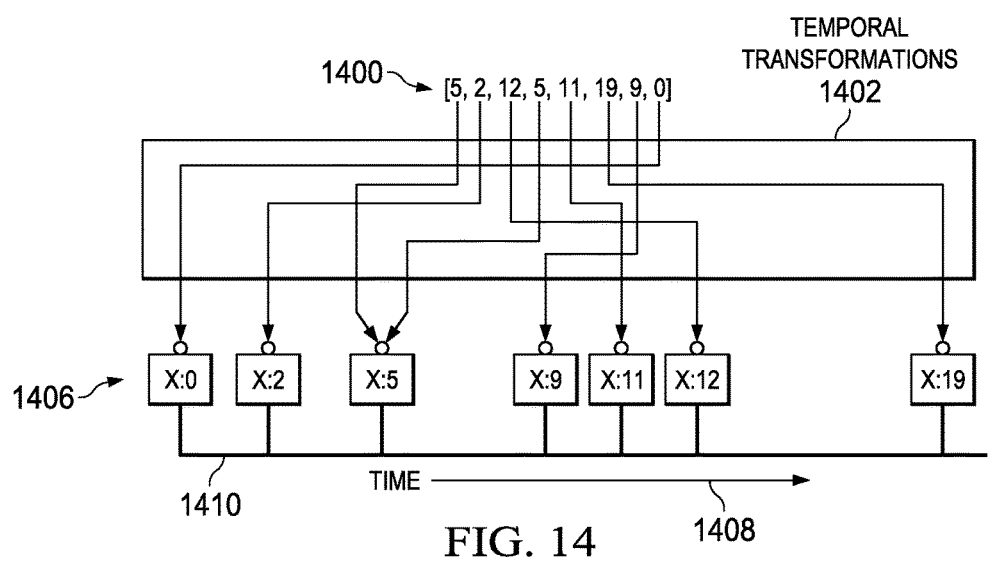
FIG. 14 is an illustration of temporal transformations generating a sequence of temporal data over time in accordance with an illustrative embodiment.

Turning next to FIG. 14, an illustration of temporal transformations generating a sequence of temporal data over time is depicted in accordance with an illustrative embodiment. In this illustrative example, pieces 1400 of data 106 are an example of pieces 209 of data 106 in FIGS. 1-3. Temporal transformations 1402 are an example of temporal transformations 124.

As depicted, pieces 1406 of temporal data 114 are generated by temporal transformations 1402 from pieces 1400. Arrow 1408 indicates the direction of the time during which pieces 1406 of temporal data 114 are generated. In the illustrative example, temporal transformations 1402 generate pieces 1406 of temporal data 114 in order 1410 over time. Order 1410 is an example of order 126 in FIG. 1. In this illustrative example, order 1410 in which pieces 1406 are generated is based on a priority to process particular ones of pieces 1400 having a lower value before others of pieces 1400 of a higher value are processed.

Figure 15:
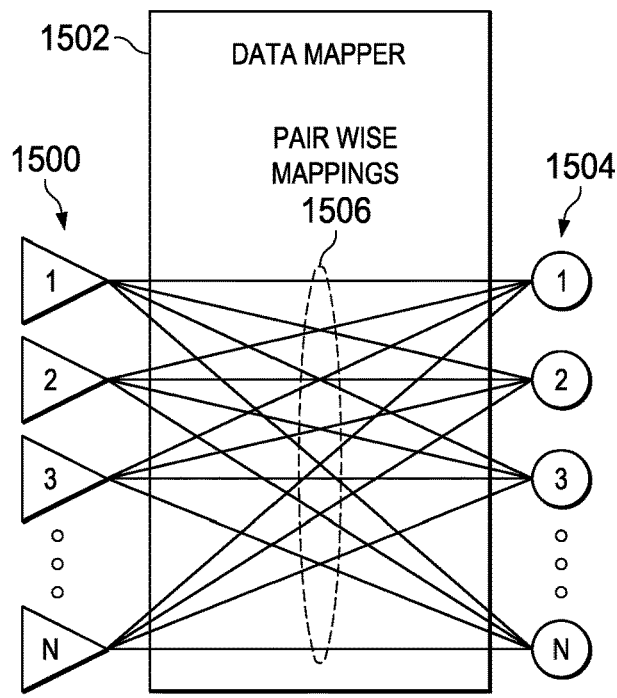
FIG. 15 is an illustration of temporal transformations generating a sequence of temporal data in accordance with an illustrative embodiment.

With reference now to FIG. 15, an illustration of mapping data is depicted in accordance with an illustrative embodiment. In this illustrative example, pieces 1500 of data 106 is an example of pieces 208 in FIG. 2 and data mapper 1502 is an example of data mapper 200 in FIG. 2.

As depicted, pieces 1500 include a number of states used as input to data mapper 1502. Pieces 1504 of data 114 are generated by data mapper 1502 from pieces 1500.

In this illustrative example, data mapper 1502 identifies the number of states in pieces 1504 based on pair wise mappings 1506 between the number of states in pieces 1500 and the number of states in pieces 1504. For example, if the number of states in pieces 1500 is center on and center off states identified from an image, the number of states in pieces 1504 may be simple cell mapping states that identify geometry of an object in the image.

Figure 17:
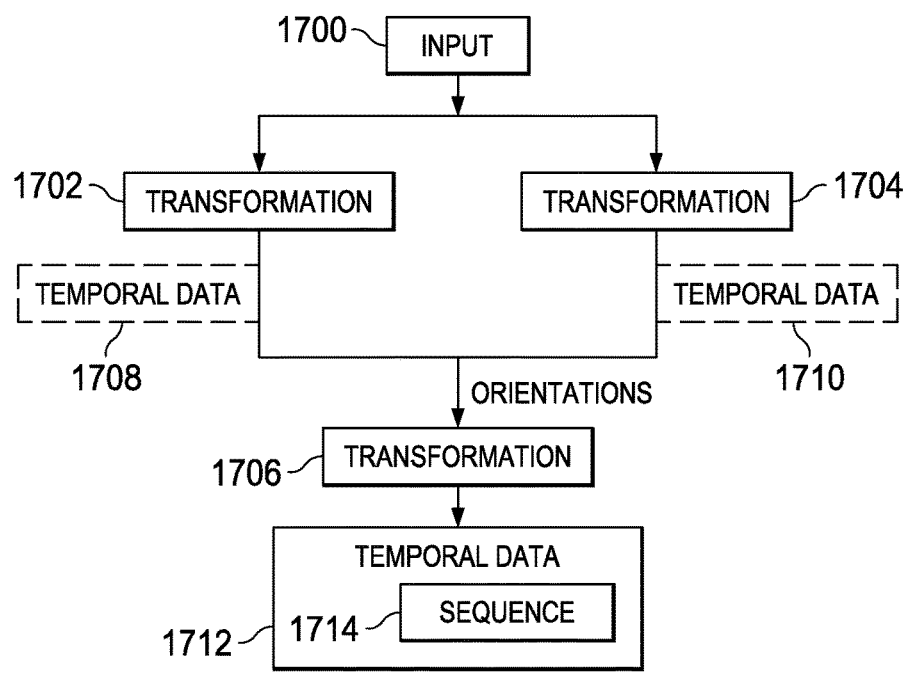
FIG. 17 is an illustration of temporal transformations generating temporal data in accordance with an illustrative embodiment.
Figure 16:
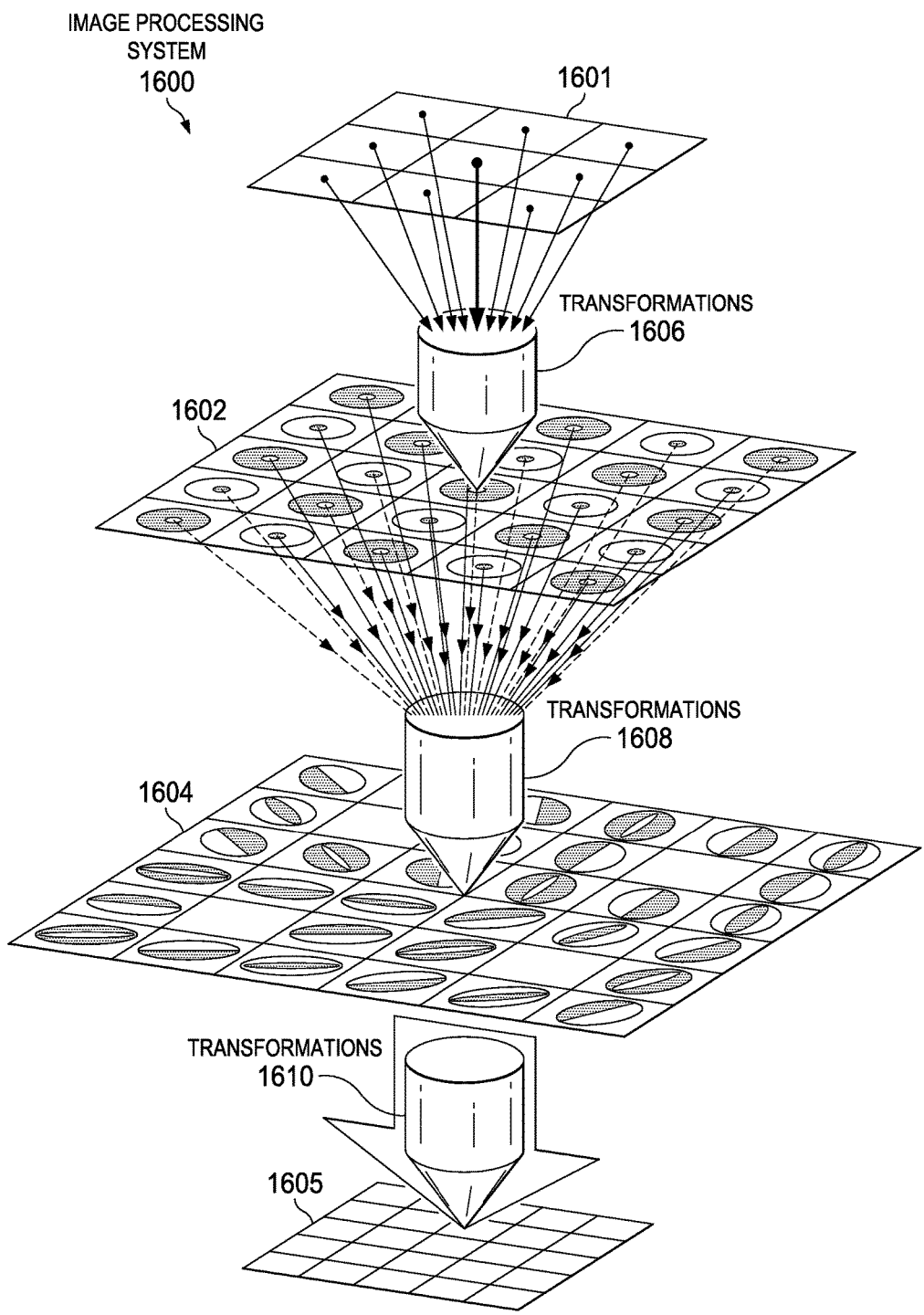
FIG. 16 is an illustration of temporal transformations generating temporal data in accordance with an illustrative embodiment.

FIGS. 16 and 17 are examples of image processing systems. These image processing systems are examples of implementations for information processor 102 of FIGS. 1-4.

Turning to FIG. 16, an illustration of transformations generating temporal data is depicted in accordance with an illustrative embodiment. This illustration shows transformations of data in an image processing system. Image processing system 1600 is an example of information processor 102.

In this illustrative example, data 1601 is an example of data 106 of FIGS. 1-3; data 1602, data 1604, and data 1605 are examples of processed data 108 in FIG. 1; and transformations 1606, transformations 1608, and transformations 1610 are examples of data modifiers 201 of FIG. 2 followed by temporal transformations 202 of FIG. 2. As depicted, data 1601 includes an image.

For example, the image in data 1601 may be a frame from a movie. Images in frames of a movie may be processed individually or collectively.

Transformations 1606 generate center on and center off data from the image in data 1601. Center on and center off data is a state of a group of pixels in an image that is based on the relative values of the group of pixels in the image. The relative values of the group of pixels include at least one of location, magnitude, or color.

In this illustrative example, the state of a group of pixels is selected from at least one of center on or center off. This state is selected based on differences in contrast between the center of the group of pixels and the outside of the group of pixels. When the state of the group of pixels is center on, the center of the group of pixels has a higher magnitude than the outside of the group of pixels. When the state of the group of pixels is center off, the center of the group of pixels has a lower magnitude of light than the outside of the group of pixels. Transformations 1606 place the center on and center off data into data 1602.

Transformations 1608 generate simple cell mapping from the center on and center off data in data 1602. Transformations 1608 place simple cell mapping into data 1604. Simple cell mapping is a state for at least one of a group of center on data or a group of center off data that identifies the orientation of the group.

Transformations 1610 identify a complex cell mapping from the simple cell mapping in data 1604. Transformations 1610 place the complex cell mapping into data 1605. This complex cell mapping is an example of pieces 116 of temporal data 114 in FIGS. 1-4. Complex cell mappings may describe the basic geometry of an object.

The state of an object can be used to derive additional states for the object. For example, the orientation of the object can be derived from the identified basic geometry when the object is of a known type. As another example, changes to the basic geometry of an object over time can be used to identify motion for the object. These changes over time can be identified by using image processing system 1600 a number of times on a sequence of images of the object.

Turning next to FIG. 17, an illustration of transformations generating temporal data is depicted in accordance with an illustrative embodiment. This illustration shows another view of image processing system 1600 in FIG. 16.

In this illustrative example, input 1700 is an example of data 1602; transformation 1702 and transformation 1704 are examples of transformations 1608; transformation 1706 is an example of transformations 1610; temporal data 1708 and temporal data 1710 are examples of data 1604; and temporal data 1712 is an example of temporal data 1605. As depicted, input 1700 includes center on data and center off data in temporal form.

Transformation 1702 generates temporal data 1708 from input 1700. Temporal data 1708 includes orientations and shapes identified from input 1700. Transformation 1704 also generates temporal data 1710 from input 1700. Temporal data 1710 also includes orientations identified from input 1700. For example, these orientations may be the result of mapping simple cell data.

Transformation 1702 sends temporal data 1708 to transformation 1706 to be processed by transformation 1706. Transformation 1704 sends temporal data 1710 to transformation 1706 to be processed by transformation 1706.

Transformation 1706 generates pieces of temporal data about an object based on the orientations and shapes in temporal data 1708 and temporal data 1710.

Transformation 1706 places these pieces into sequence 1714 of temporal data 1712. Sequence 1714 of temporal data 1712 is an example of sequence 128 of temporal data 114 in FIGS. 1-4.

Figure 18:
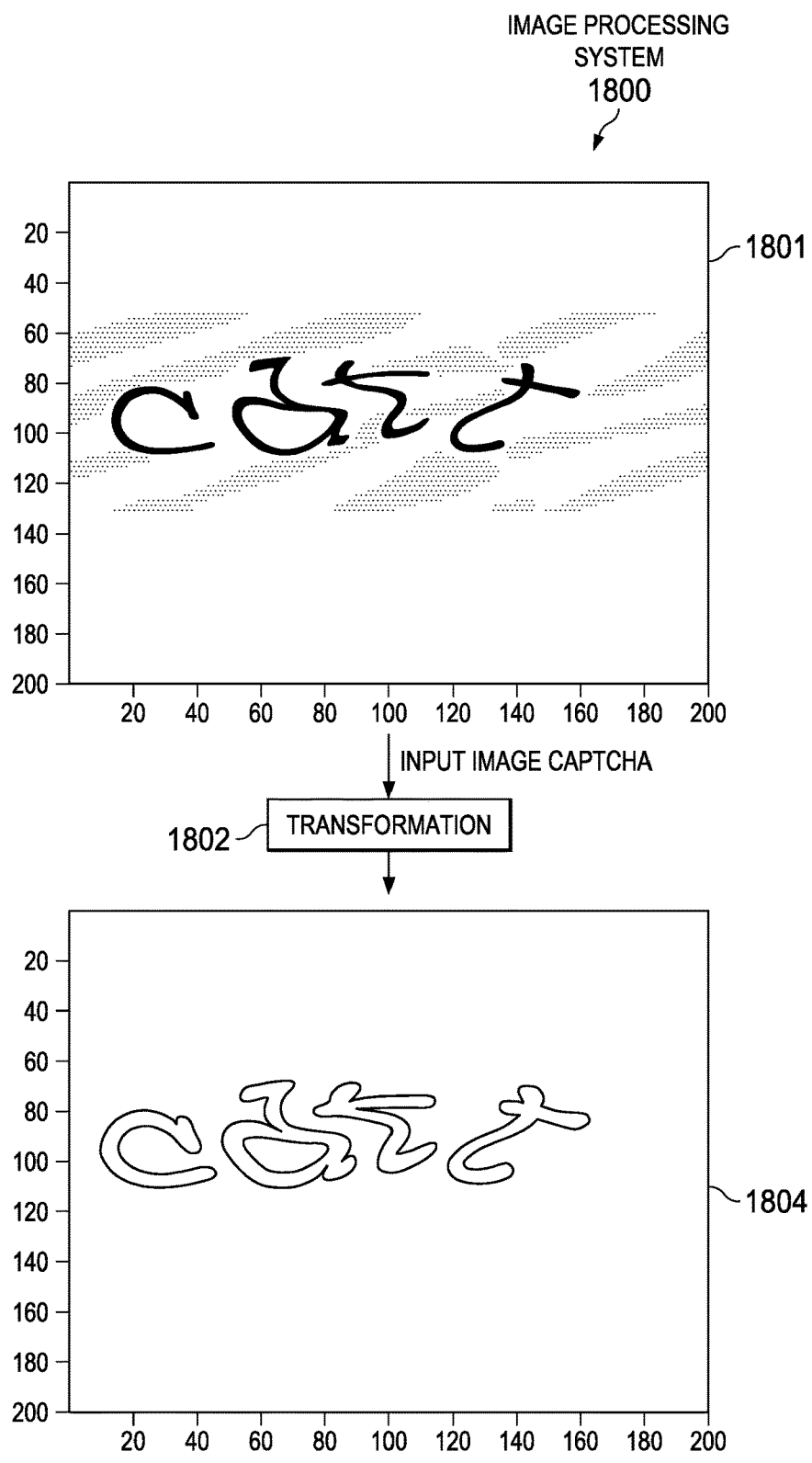
FIG. 18 is an illustration of a temporal transformation generating temporal data in accordance with an illustrative embodiment.

Turning now to FIG. 18, an illustration of a transformation generating temporal data is depicted in accordance with an illustrative embodiment. This illustration shows a transformation of data in an image processing system. Image processing system 1800 is another example of information processor 102 of FIGS. 1-4. In this illustration, the image being processed has both text and noise, and the output of image processing system 1800 shows the outline of the text in the image without the noise.

In this illustrative example, data 1801 is an example of data 106; transformation 1802 is an example of a data modifier in data modifiers 201 followed by a temporal transformation in temporal transformations 202; and temporal data 1804 is an example of temporal data 114. As depicted, data 1801 includes a captcha image. Captcha images are images designed to test whether a human is present to identify letters in the image that are partially obscured by noise in the image.

Transformation 1802 identifies an image that includes only an outline of the letters in the captcha image. In this illustrative example, transformation 1802 identifies the image of the outline of the letters from the captcha image using a temporal de-convolution technique. This temporal de-convolution technique is implemented with a vector matrix multiply followed by a temporal transformation. A captcha image is an image used to determine whether or not a user is human. For example, a user may be asked to provide a description of letters shown in the captcha image in data 1801.

A de-convolution technique is a technique for removing convolution in data. A temporal de-convolution technique is a technique for removing convolution in data over a sequence of attempts over time to remove the convolution from the data. For example, transformation 1802 may include the generation of center on and center off data. In this example, transformation 1802 uses the center on and center off data to identify edges of the outline of the letters from the captcha image.

As depicted this temporal de-convolution technique filters out the noise in the captcha image leaving only the edges of the letters from the captcha image in data 1801. Transformation 1802 places the image of the outline of the letters from the captcha image into temporal data 1804.

The illustrations of image processing system 1600 in FIG. 16 and image processing system 1800 in FIG. 18 are only provided as an example of one implementation of information processor 102 in FIG. 1 and is not meant to limit the manner in which information processor 102 may be implemented. For example, additional transformations other than transformation 1802 may be used in image processing system 1800.

As another example, transformations 1608, transformations 1606, and transformations 1610 may be combined to form a group of transformations. In this example, the group of transformations may be processed in parallel. In yet another example, the output of transformations 1608, transformations 1606, and transformations 1610 may be used as input in a subsequent use of transformations 1608, transformations 1606, and transformations 1610.

Figure 19:
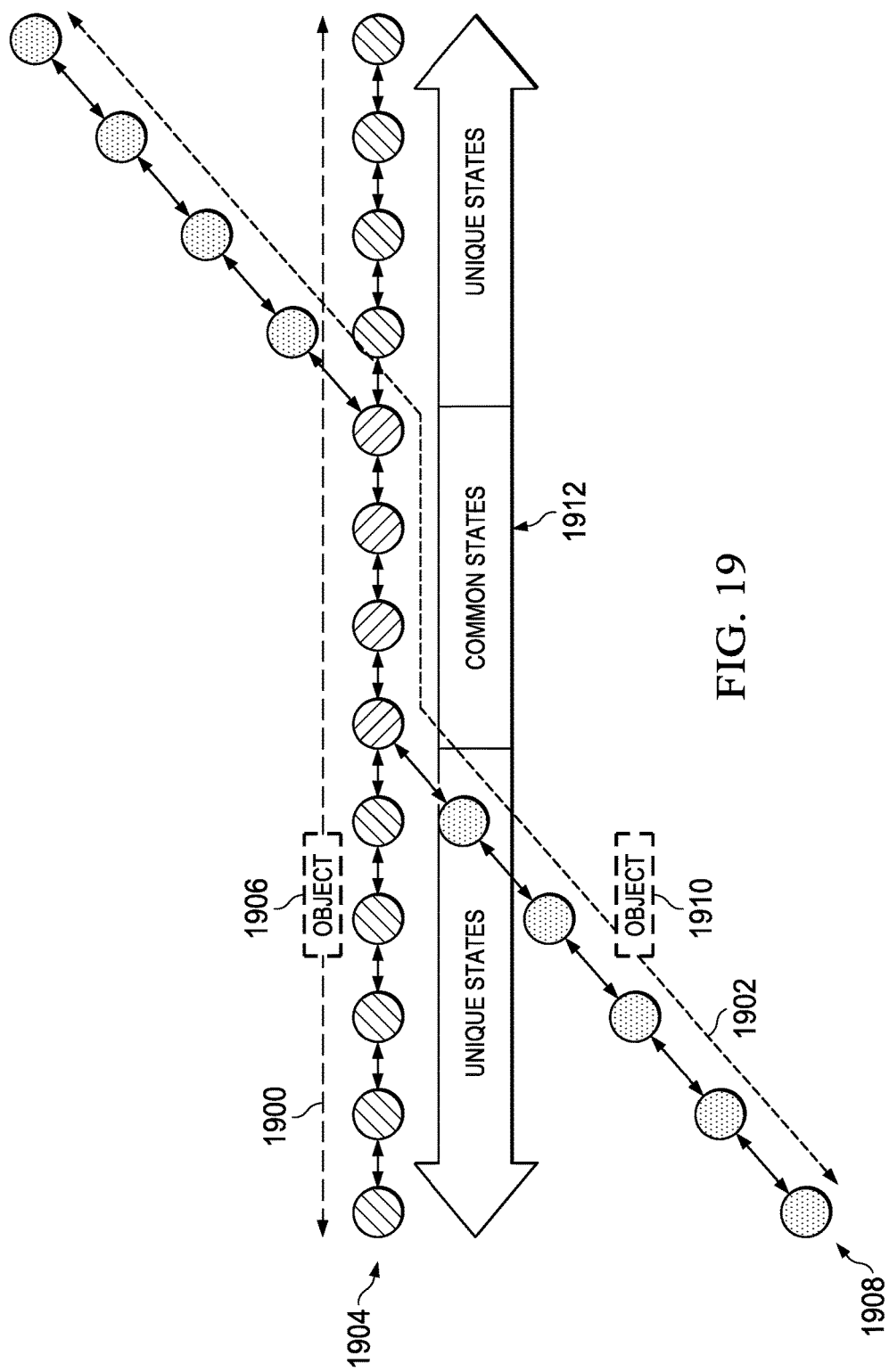
FIG. 19 is an illustration of the paths of two objects based on states of the two objects in accordance with an illustrative embodiment.
Figure 20:
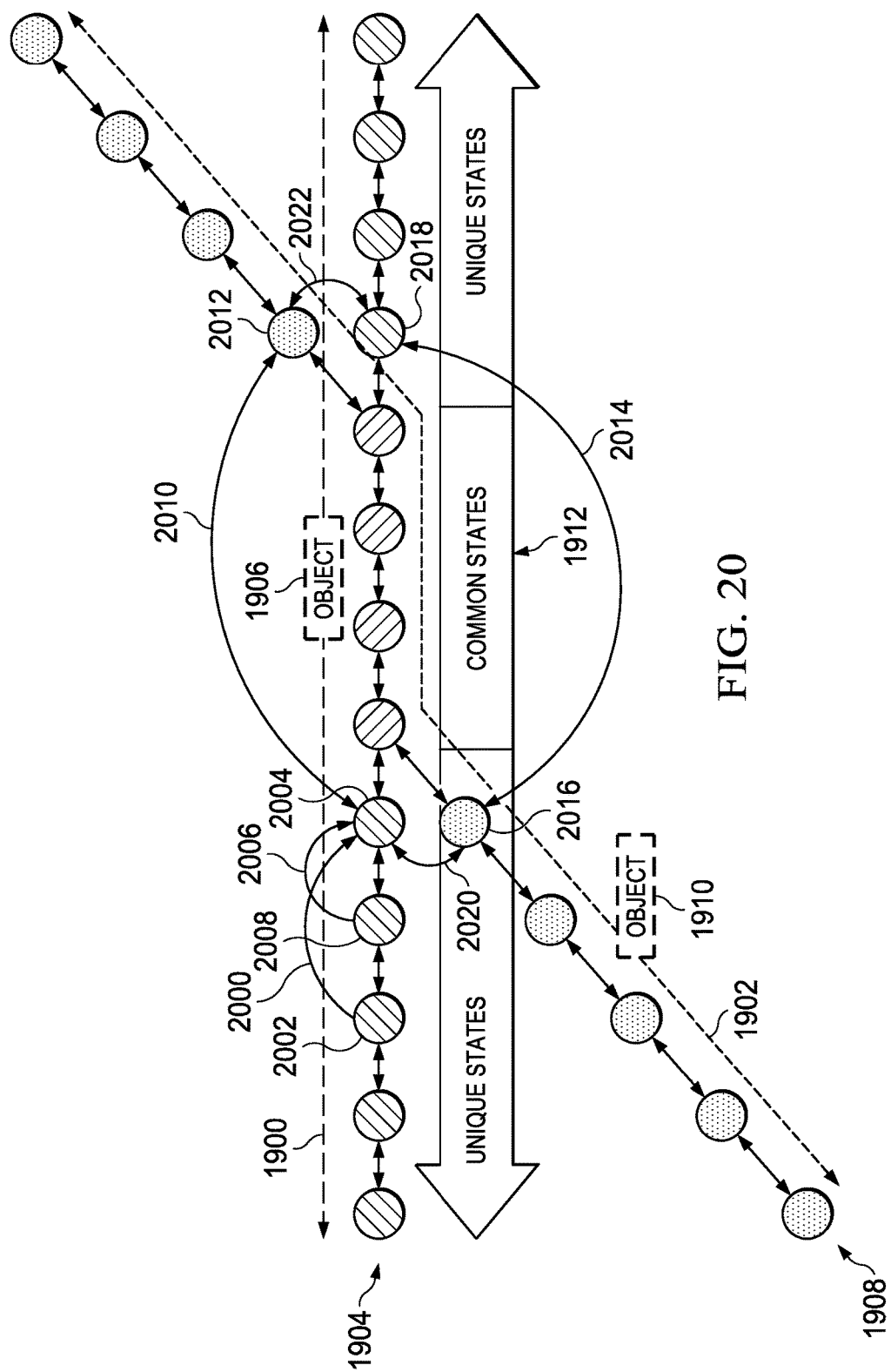
FIG. 20 is an illustration of relationships between states of objects in accordance with an illustrative embodiment.

FIGS. 19-20 illustrate an example of using states of objects to identify a spatial relationship between the objects. With reference now to FIG. 19, an illustration of the paths of two objects based on states of the two objects is depicted in accordance with an illustrative embodiment. In this illustrative example, path 1900 and path 1902 are examples of data 106 in FIGS. 1-3.

As depicted, path 1900 is a sequence of states 1904 of object 1906. In the illustrative example, the sequence of states 1904 is a sequence of allowed transitions from one state to the next state in the sequence. These allowed transitions are shown as arrows between states in the sequence of states 1904.

In this illustrative example, states 1904 may include vectors of object 1906 over time. A vector of an object is a speed and direction that the object is moving in when the object is at a particular location. These vectors are shown in FIG. 19 as arrows between states of the objects.

Path 1902 includes a sequence of states 1908 of object 1910. The sequence of states 1908 is a sequence of allowed transitions from one state to the next state in the sequence. These allowed transitions are shown as arrows between states in the sequence of states 1908. In this illustrative example, states 1908 may include vectors of object 1910 over time.

In this illustrative example, common states 1912 between these objects are states in which portions of the paths of the objects intersect. Where the paths of objects intersect, a possibility exists that the objects may occupy a same location at the same time.

With reference next to FIG. 20, an illustration of relationships between states of objects is depicted in accordance with an illustrative embodiment. In this illustrative example, relationships are shown between states 1904 of object 1906, between states 1908 of object 1910. These relationships are used by temporal transformations 124 to identify pieces 116 of temporal data 114.

As depicted, relationship 2000 is between state 2002 of object 1906 and state 2004 of object 1906; relationship 2006 is between state 2008 of object 1906 and state 2004 of object 1906; relationship 2010 is between state 2004 of object 1906 and state 2012 of object 1910; relationship 2014 is between state 2016 of object 1910 and state 2018 of object 1906; relationship 2020 is between state 2004 of object 1906 and state 2016 of object 1910; and relationship 2022 is between state 2012 of object 1910 and state 2018 of object 1906.

In this illustrative example, relationship 2000 indicates that the presence of state 2002 for object 1906 has the effect of increasing the probability for state 2004 being present for object 1906. Similarly, relationship 2006 indicates that the activation of state 2008 for object 1906 has the effect of increasing the probability for state 2004 being present for object 1906. An activation of state 2008 for object 1906 is a change of state 2008 to a value indicating presence of state 2008 for object 1906.

Relationship 2010, relationship 2014, relationship 2020, and relationship 2022 are relationships between states of object 1906 and states of object 1910. In this illustrative example, activation of at least one of state 2016 or state 2012 inhibits the probability of transitions to state 2004 and state

2018. Similarly, activation of at least one of state 2004 or state 2018 inhibit the probability of transitions to state 2016 and state 2012.

For example, an information processor may process activations of states 1904 and states 1908 using temporal transformations based on these relationships. In the illustrative example, these temporal transformations generate pieces of temporal data that predict the order in which future states should be present for objects. The order is based on the relationships between states.

In this illustrative example, the pieces of temporal data produced by these temporal transformations include time delays based on the order. For example, a piece of temporal data that is output from the activation of state 2002 for object 1906 has a time delay that is longer than the time delay for a piece of temporal data that is output from the activation of state 2008 for object 1906. The time delay for the piece of temporal data that is output from the activation of state 2002 is longer because relationship 2000 has a longer distance between states than relationship 2006.

Turning next to FIG. 21, an illustration of a flowchart of a process for processing data is depicted in accordance with an illustrative embodiment. The process illustrated in FIG. 21 may be implemented in information processing environment 100. For example, the process may be implemented using information processor 102 in FIG. 1.

The process begins by identifying the data (step 2100). The data in step 2100 may be any type of data in which processing should occur. For example, the data may be images, sensor data, or other types of data. Further, the data may be received as a stream of data. In some cases, the stream of data may be received in real time. In other words, the data is received as quickly as it is generated without any intended delay in sending the data.

The process processes the data in parallel using temporal transformations to form pieces of temporal data (step 2102). The process then places the pieces of temporal data in an order as the pieces of temporal data are generated by the temporal transformations to form a sequence of temporal data (step 2104) with the process terminating thereafter. The order of the sequence is based on a priority of when the pieces of temporal data should be processed. The generation of the sequence of temporal data enables performing an action. In particular, further processing of the data may result in action being taken.

With reference next to FIG. 22, another illustration of a flowchart of a process for processing data is depicted in accordance with an illustrative embodiment. The process illustrated in FIG. 22 may be implemented in information processing environment 100. For example, the process also may be implemented using information processor 102 in FIG. 1.

The process begins by identifying a key in a database that maps data in the database to temporal transformations (step 2200). In step 2200, the temporal transformations form pieces of temporal data from the data.

The process then retrieves the data in the database for the temporal transformations using the key (step 2202). The process then processes the data in parallel using the temporal transformations to form pieces of temporal data (step 2204). The process then places the pieces of temporal data in an order as the pieces of temporal data are generated by the temporal transformations to form a sequence of temporal data (step 2206) with the process terminating thereafter.

Turning to FIG. 23, another illustration of a flowchart of a process for processing data is depicted in accordance with an illustrative embodiment. The process illustrated in FIG. 23 may be implemented in information processing environment 100. For example, the process also may be implemented using information processor 102 in FIG. 3.

The process begins by retrieving data and metadata using a key that maps the data and metadata to temporal transformations (step 2300). The process next processes the data and metadata using the temporal transformations to generate pieces of temporal data (step 2302). In step 2302, the temporal transformations generate pieces of temporal data from the data and metadata in parallel.

The process then places the pieces of temporal data in an order as the pieces of temporal data are generated by the temporal transformations to form a sequence of temporal data (step 2304) with the process terminating thereafter. The order of the sequence is based on a priority of when the pieces of temporal data should be processed. The amount of resources allocated to the temporal transformations in step 2302 is based on this priority.

The mapping of data and metadata to the temporal transformations in step 2300 may be based on this priority. For example, first pieces of data and metadata may be mapped to a first temporal transformation before second pieces are mapped to a second temporal transformation when the first temporal transformation generates a piece of temporal data with a higher priority than a piece of temporal data generated by the second temporal transformation.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 24:
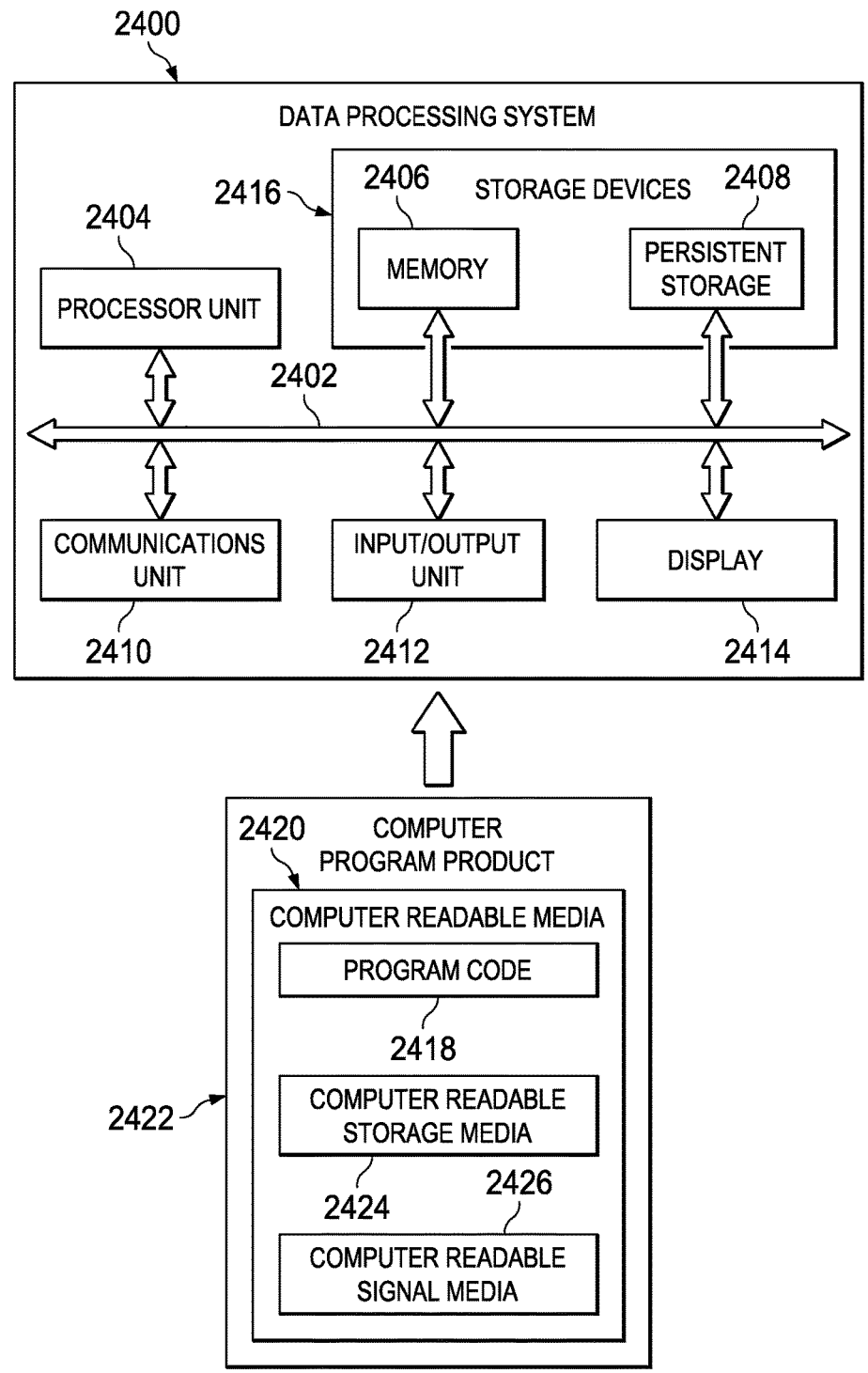
FIG. 24 is an illustration of a block diagram of a data processing system in accordance with an illustrative embodiment.

Turning now to FIG. 24, an illustration of a block diagram of a data processing system is depicted in accordance with an illustrative embodiment. Data processing system 2400 may be used to implement computer system 112 in FIG. 1. In this illustrative example, data processing system 2400 includes communications framework 2402, which provides communications between processor unit 2404, memory 2406, persistent storage 2408, communications unit 2410, input/output (I/O) unit 2412, and display 2414. In this example, communication framework may take the form of a bus system.

Processor unit 2404 serves to execute instructions for software that may be loaded into memory 2406. Processor unit 2404 may be a number of processors, a multi-processor core, or some other type of processor, depending on the particular implementation.

Memory 2406 and persistent storage 2408 are examples of storage devices 2416. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 2416 may also be referred to as computer readable storage devices in these illustrative examples. Memory 2406, in these examples, may be, for example, a random access memory or any other suitable volatile or non-volatile storage device. Persistent storage 2408 may take various forms, depending on the particular implementation.

For example, persistent storage 2408 may contain one or more components or devices. For example, persistent storage 2408 may be a hard drive, a flash memory, a rewritable optical disk, a rewritable magnetic tape, or some combination of the above. The media used by persistent storage 2408 also may be removable. For example, a removable hard drive may be used for persistent storage 2408.

Communications unit 2410, in these illustrative examples, provides for communications with other data processing systems or devices. In these illustrative examples, communications unit 2410 is a network interface card.

Input/output unit 2412 allows for input and output of data with other devices that may be connected to data processing system 2400. For example, input/output unit 2412 may provide a connection for user input through at least of a keyboard, a mouse, or some other suitable input device. Further, input/output unit 2412 may send output to a printer. Display 2414 provides a mechanism to display information to a user.

Instructions for at least one of the operating system, applications, or programs may be located in storage devices 2416, which are in communication with processor unit 2404 through communications framework 2402. The processes of the different embodiments may be performed by processor unit 2404 using computer-implemented instructions, which may be located in a memory, such as memory 2406.

These instructions are referred to as program code, computer usable program code, or computer readable program code that may be read and executed by a processor in processor unit 2404. The program code in the different embodiments may be embodied on different physical or computer readable storage media, such as memory 2406 or persistent storage 2408.

Program code 2418 is located in a functional form on computer readable media 2420 that is selectively removable and may be loaded onto or transferred to data processing system 2400 for execution by processor unit 2404. Program code 2418 and computer readable media 2420 form computer program product 2422 in these illustrative examples. In one example, computer readable media 2420 may be computer readable storage media 2424 or computer readable signal media 2426. In these illustrative examples, computer readable storage media 2424 is a physical or tangible storage device used to store program code 2418 rather than a medium that propagates or transmits program code 2418.

Alternatively, program code 2418 may be transferred to data processing system 2400 using computer readable signal media 2426. Computer readable signal media 2426 may be, for example, a propagated data signal containing program code 2418. For example, computer readable signal media 2426 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 2400 are not meant to provide architectural limitations to the manner in which different embodiments may be implemented. The different illustrative embodiments may be implemented in a data processing system including components in addition to or in place of those illustrated for data processing system 2400. Other components shown in FIG. 24 can be varied from the illustrative examples shown. The different embodiments may be implemented using any hardware device or system capable of running program code 2418.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for processing data, the method comprising:
   identifying, by a computer system, the data in a first state;
   processing, by the computer system, the data in parallel using temporal transformations to form pieces of temporal data, wherein the temporal data comprises all of: a value describing a state of an object, a probability that the state of the object is correct, and a time for which the probability exists for the state of the object, and wherein the temporal transformations place the pieces of temporal data into a data structure;
   determining, by the computer system, a priority with which each piece of temporal data is to be processed to enable performance of an action, wherein determining priority is based on all of the state, the probability that the state is correct, and the time for which the probability exists;
   placing, by the computer system, the pieces of temporal data into a sequence of temporal data according to priority, wherein the sequence of temporal data can be accessed by a processor more quickly and with less use of processor resources than the data in the first state; and
   performing, by the computer system, an action based on processing the pieces of temporal data according to the sequence of temporal data.

2. The method of claim 1, wherein the temporal transformations form a model for placing the pieces of temporal data into the sequence of temporal data.

3. The method of claim 1, wherein a number of the temporal transformations change over time based on a learning system, and wherein the temporal transformations further store the sequence as an additional piece of data in the database such that the pieces of temporal data include prior pieces of temporal data previously generated by prior temporal transformations.

4. The method of claim 1, wherein the data includes metadata about the data, and wherein the temporal transformations convert the data into the pieces of temporal data based on the metadata.

5. The method of claim 4, wherein the metadata about the data includes additional temporal data.

6. The method of claim 5, wherein the additional temporal data is for at least one of the data or an object affected by the pieces of temporal data.

7. The method of claim 1, wherein the data in the first state is a stream of data and the sequence of temporal data is a stream of the pieces of temporal data.

8. The method of claim 1, further comprising:
    filtering ones of the pieces of temporal data and removing from the data structure those pieces of temporal data that fail to meet a minimum probability that the state is correct.

9. The method of claim 8 further comprising:
    storing a key in the database that maps the sequence of temporal data to the data in the first state.

10. The method of claim 8, wherein the database is selected from at least one of a hierarchical database or a relational database.

11. The method of claim 8, wherein the processing step comprises:
    identifying, by the database in the computer system, the data in the first state in the database using a key in the database that maps the data in the first state to the temporal transformations;
    retrieving the data in the database using the key; and
    processing, by the database in the computer system, the data retrieved in parallel using the temporal transformations to form the pieces of temporal data.

12. A method for processing data, the method comprising:
    identifying, by a computer system, a key in a database that maps the data in a first state in the database to temporal transformations, wherein the temporal transformations form pieces of temporal data from the data, wherein the temporal data comprises all of: a value describing a state of an object, a probability that the state of the object is correct, and a time for which the probability exists for the state of the object;
    retrieving, by the computer system, the data for the temporal transformations using the key;
    processing, by the computer system, the data in parallel using the temporal transformations to form the pieces of temporal data, and wherein the temporal transformations place the pieces of temporal data into a data structure;
    determining, by the computer system, a priority with which each piece of temporal data is to be processed to enable performance of an action, wherein determining is based on all of the state, the probability that the state is correct, and the time for which the probability exists;
    placing, by the computer system, the pieces of temporal data into a sequence of temporal data according to priority, wherein the sequence of temporal data can be accessed by a processor more quickly and with less use of processor resources than the data in the first state; and
    performing, by the computer system, an action based on processing the pieces of temporal data according to the sequence of temporal data, wherein the action performed is one of generating an alert, generating a warning, sending a message, displaying an indicator on a display system, displaying an indicator identifying a location of an object, tracking an object, identifying an object.

13. A computer system comprising:
    an information processor that identifies data in a first state; processes the data in parallel using temporal transformations to form pieces of temporal data, wherein the temporal data comprises all of: a value describing a state of an object, a probability that the state of the object is correct, and a time for which the probability exists for the state of the object, and wherein the temporal transformations place the pieces of temporal data into a data structure; determines a priority with which each piece of temporal data is to be processed to enable performance of an action, wherein determining is based on all of the state, the probability that the state is correct, and the time for which the probability exists; places the pieces of temporal data into a sequence of temporal data according to priority, wherein the sequence of temporal data can be accessed more quickly and with less use of processor resources than the data in the first state; and performing an action based on processing the pieces of temporal data according to the sequence of temporal data.

14. The computer system of claim 13, wherein the temporal transformations form a model for placing the pieces of temporal data into the sequence of temporal data.

15. The computer system of claim 13, wherein a number of the temporal transformations change over time based on a learning system.

16. The computer system of claim 13, wherein the data includes metadata about the data, and wherein the temporal transformations convert the data into the pieces of temporal data based on the metadata.

17. The computer system of claim 16, wherein the metadata about the data includes additional temporal data.

18. The computer system of claim 17, wherein the additional temporal data is for at least one of the data or an object affected by the pieces of temporal data.

19. The computer system of claim 13, wherein the data in the first state is a stream of data and the sequence of temporal data is a stream of the pieces of temporal data.

20. The computer system of claim 13, wherein the data is in a database.

21. The computer system of claim 20 further comprising:
    storing a key in the database that maps the sequence of temporal data to the data in the first state.

22. The computer system of claim 20, wherein the database is selected from at least one of a hierarchical database or a relational database.

23. A computer program product for processing data, the computer program product comprising:
    a computer readable storage media; and
    program code, stored on the computer readable storage media, for:
        identifying the data in a first state;
        processing the data in parallel using temporal transformations to form pieces of temporal data, wherein the temporal data comprises all of: a value describing a state of an object, a probability that the state of the object is correct, and a time for which the probability exists for the state of the object, and wherein the temporal transformations place the pieces of temporal data into a data structure;

determining a priority with which each piece of temporal data is to be processed to enable performance of an action, wherein determining is based on all of the state, the probability that the state is correct, and the time for which the probability exists;

placing the pieces of temporal data into a sequence of temporal data according to priority, wherein the sequence of temporal data can be accessed by a processor more quickly and with less use of processor resources than the data in the first state; and performing an action based on processing the pieces of temporal data according to the sequence of temporal data, wherein the action performed is one of generating an alert, generating a warning, sending a message, displaying an indicator on a display system, displaying an indicator identifying a location of an object, tracking an object, identifying an object.

24. The method of claim 1, wherein the action performed based on processing the pieces of temporal data is one of:

generating an alert;
generating a warning;
sending a message;
displaying an indicator on a display system;
displaying an indicator identifying a location of an object;
tracking an object; or
identifying an object.

25. The computer system of claim 13, wherein the action performed based on processing the pieces of temporal data is one of:

generating an alert;
generating a warning;
sending a message;
displaying an indicator on a display system;
displaying an indicator identifying a location of an object;
tracking an object; or
identifying an object.

\* \* \* \* \*